US012771923B2

(12) United States Patent
Ehira

(10) Patent No.: US 12,771,923 B2
(45) Date of Patent: Oct. 20, 2026

(54) IMAGE CAPTURE APPARATUS AND CONTROL METHOD WITH SIGHT LINE DETECTION

(71) Applicant: CANON KABUSHIKI KAISHA, Tokyo (JP)

(72) Inventor: Tatsuya Ehira, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/185,766

(22) Filed: Apr. 22, 2025

(65) Prior Publication Data

US 2025/0254415 A1 Aug. 7, 2025

Related U.S. Application Data

(63) Continuation of application No. PCT/JP2023/038676, filed on Oct. 26, 2023.

(30) Foreign Application Priority Data

Nov. 1, 2022 (JP) ................................ 2022-175677
Oct. 12, 2023 (JP) ................................ 2023-176879

(51) Int. Cl.
*H04N 23/611* (2023.01)
*H04N 23/62* (2023.01)
(Continued)

(52) U.S. Cl.
CPC ........... *H04N 23/611* (2023.01); *H04N 23/62* (2023.01); *H04N 23/631* (2023.01); *H04N 23/635* (2023.01); *H04N 23/67* (2023.01)

(58) Field of Classification Search
CPC .... H04N 23/611; H04N 23/62; H04N 23/631; H04N 23/635; H04N 23/67; H04N 23/60
See application file for complete search history.

(56) References Cited

U.S. PATENT DOCUMENTS 11,523,048 B2 * 12/2022 Yoshimura ........... H04N 23/633
11,538,191 B2 * 12/2022 Ogawa ................. H04N 23/631
(Continued)

FOREIGN PATENT DOCUMENTS

JP H10191132 A 7/1998
JP 2001346080 A 12/2001
(Continued)

OTHER PUBLICATIONS

Foreign Patent Documents #2 and 4-8 were cited in the International Search Report dated Dec. 12, 2023, of International Application No. PCT/JP2023/038676, which is enclosed without an English translation.

*Primary Examiner* — Nicholas G Giles
(74) *Attorney, Agent, or Firm* — Cowan, Liebowitz & Latman, P.C.

(57) ABSTRACT

An image capture apparatus includes an imaging unit, a processing unit that performs predetermined processing for an object in an image captured by the imaging unit, a sight line detection unit that detects a sight line position of a user, a first operation unit that issues a shooting instruction, a second operation unit different from the first operation unit, and a control unit that performs control to execute the predetermined processing for a first object in the image in accordance with a first pressing operation on the second operation unit and to switch a target of the predetermined processing to an object corresponding to the sight line position of the user in accordance with a second pressing operation following the first pressing operation on the second operation unit.

19 Claims, 21 Drawing Sheets

(51) Int. Cl.

| | |
|---|---|
| ***H04N 23/63*** | (2023.01) |
| ***H04N 23/67*** | (2023.01) |

(56) References Cited

U.S. PATENT DOCUMENTS

| | | | | |
|---|---|---|---|---|
| 2020/0341630 | A1 | 10/2020 | Fukushima | |
| 2021/0157400 | A1 | 5/2021 | Funatsu | |
| 2021/0258473 | A1* | 8/2021 | Yoshimura | H04N 23/672 |
| 2021/0375002 | A1* | 12/2021 | Ogawa | H04N 23/631 |
| 2022/0321770 | A1 | 10/2022 | Ogawa | |

FOREIGN PATENT DOCUMENTS

| | | | |
|---|---|---|---|
| JP | 2014017665 | A | 1/2014 |
| JP | 2019008076 | A | 1/2019 |
| JP | 2020181450 | A | 11/2020 |
| JP | 2020181513 | A | 11/2020 |
| JP | 2021067853 | A | 4/2021 |
| JP | 2021083041 | A | 5/2021 |
| JP | 2021087068 | A | 6/2021 |

* cited by examiner

FIG. 7A

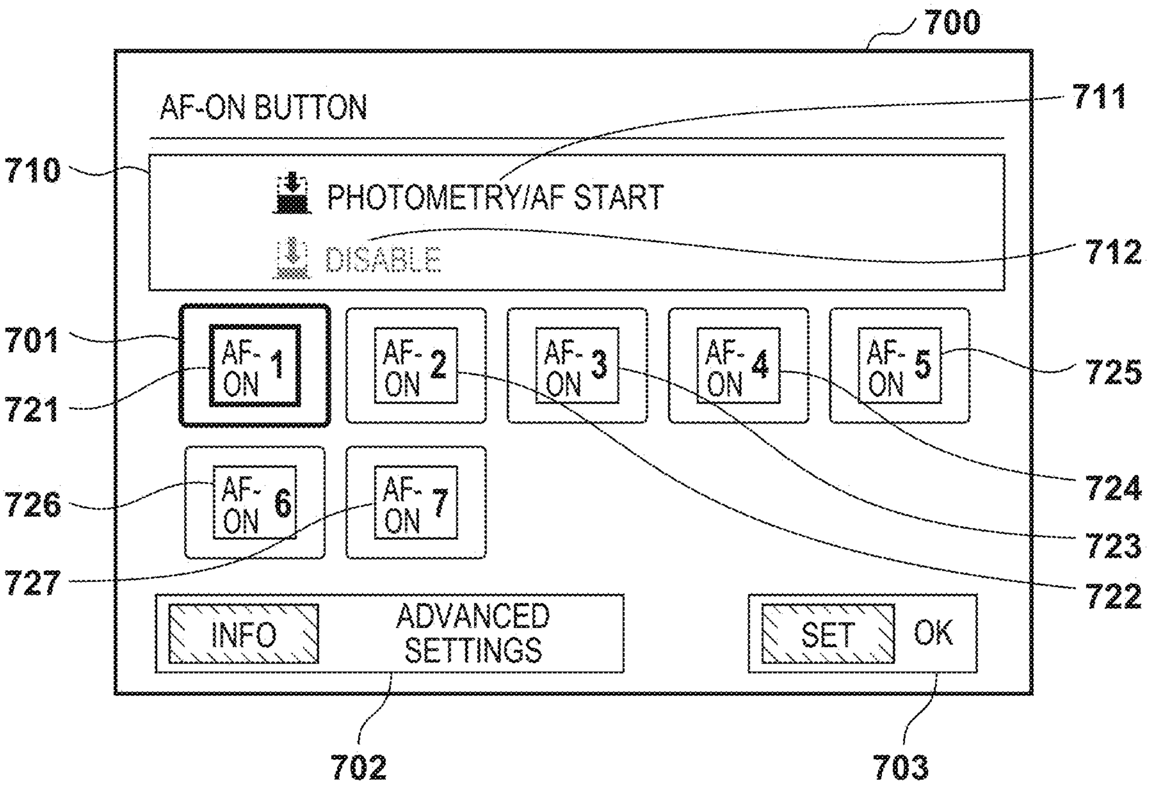

FIG. 7B

| ITEM | AF-ON BUTTON HALF-PRESSING OPERATION | AF-ON BUTTON FULL-PRESSING OPERATION |
|---|---|---|
| AFON1 | USER SETTING | DISABLE |
| AFON2 | DISABLE | USER SETTING |
| AFON3 | PHOTOMETRY/AF START | MOVING AF FRAME BY SIGHT LINE |
| AFON4 | PHOTOMETRY/AF START | PUPIL AF |
| AFON5 | PHOTOMETRY/AF START | STOP AF |
| AFON6 | PHOTOMETRY/AF START | OBJECT SELECTION CHANGE |
| AFON7 | PHOTOMETRY/AF START | ONE SHOT/SERVO SWITCHING |

IMAGE CAPTURE APPARATUS AND CONTROL METHOD WITH SIGHT LINE DETECTION

CROSS-REFERENCE TO RELATED APPLICATIONS

This application is a Continuation of International Patent Application No. PCT/JP2023/038676, filed Oct. 26, 2023, which claims the benefits of Japanese Patent Application Nos. 2022-175677, filed Nov. 1, 2022 and 2023-176879, filed Oct. 12, 2023, all of which are hereby incorporated by reference herein in their entirety.

BACKGROUND OF THE INVENTION

Field of the Invention

The present invention relates to a technique for operating an image capture apparatus.

Background Art

An image capture apparatus such as a digital camera can execute a desired function (for example, an autofocus function) by assigning the desired function to a predetermined operation member and operating the predetermined operation member at the time of shooting. The image capture apparatus has various kinds of functions in addition to the autofocus function, and functions that can be assigned to operation members by a user are also increased.

Since the user can assign a desired function to an operation member but needs to operate a plurality of operation members when executing another function after executing the desired function, the number of steps of the operation may be increased, thereby making it difficult to perform the operation. For example, in a case where after operating an operation member to execute autofocus for a given object, the user wants to execute autofocus again for a different object, he/she needs to operate a plurality of operation units, and thus focusing on the changed object may be delayed, thereby causing a loss of a shooting opportunity.

To solve this problem, PTL 1 describes a method of making it possible to execute a different function in accordance with a different operation on one operation member, and PTL 2 describes a method of deciding an object as an autofocus target based on the sight line detection position of a user and an object position.

CITATION LIST

Patent Literature

PTL 1: Japanese Patent Laid-Open No. 2001-346080

PTL 2: Japanese Patent Laid-Open No. 2019-008076

In PTL 1, moving image recording can be executed by pressing an operation member (shutter-release button) halfway and still image shooting can be executed by pressing the operation member fully. However, there is a case where the shutter-release button is desirably fixed as a still image shooting function, and when, in this case, the function to be executed is changed as in PTL 1, original still image shooting cannot be executed. In addition, when performing an autofocus operation using an operation member different from the shutter-release button, the user just does not operate the shutter-release button, and thus the effect of reducing the number of steps of the operation cannot be obtained.

In PTL 2, the autofocus target may automatically be decided against a user's intention.

SUMMARY OF THE INVENTION

The present invention has been made in consideration of the above problems, and realizes techniques capable of appropriately using a plurality of functions related to predetermined processing by one operation unit on which a plurality of pressing operations can be performed and thus reducing the number of steps of the operation.

In order to solve the aforementioned problems, the present invention provides an image capture apparatus comprising:

- an imaging unit;
- a processing unit configured to perform predetermined processing for an object in an image captured by the imaging unit;
- a sight line detection unit configured to detect a sight line position of a user;
- a first operation unit configured to issue a shooting instruction;
- a second operation unit different from the first operation unit; and
- a control unit configured to perform control to execute the predetermined processing for a first object in the image in accordance with a first pressing operation on the second operation unit and to switch a target of the predetermined processing to an object corresponding to the sight line position of the user in accordance with a second pressing operation following the first pressing operation on the second operation unit.

In order to solve the aforementioned problems, the present invention provides a control method for an image capture apparatus, wherein the image capture apparatus comprises:

- an imaging unit;
- a processing unit configured to perform predetermined processing for an object in an image captured by the imaging unit;
- a sight line detection unit configured to detect a sight line position of a user;
- a first operation unit configured to issue a shooting instruction; and
- a second operation unit different from the first operation unit, wherein the control method comprises:

performing control to execute the predetermined processing for a first object in the image in accordance with a first pressing operation on the second operation unit and to switch a target of the predetermined processing to an object corresponding to the sight line position of the user in accordance with a second pressing operation following the first pressing operation on the second operation unit.

Further features of the present invention will become apparent from the following description of exemplary embodiments with reference to the attached drawings.

BRIEF DESCRIPTION OF THE DRAWINGS

FIG. 7A is a view for explaining a method of assigning a function to an operation member according to the second embodiment.

FIG. 7B is a view for explaining the method of assigning the function to the operation member according to the second embodiment.

DESCRIPTION OF THE EMBODIMENTS

Figure 1A:
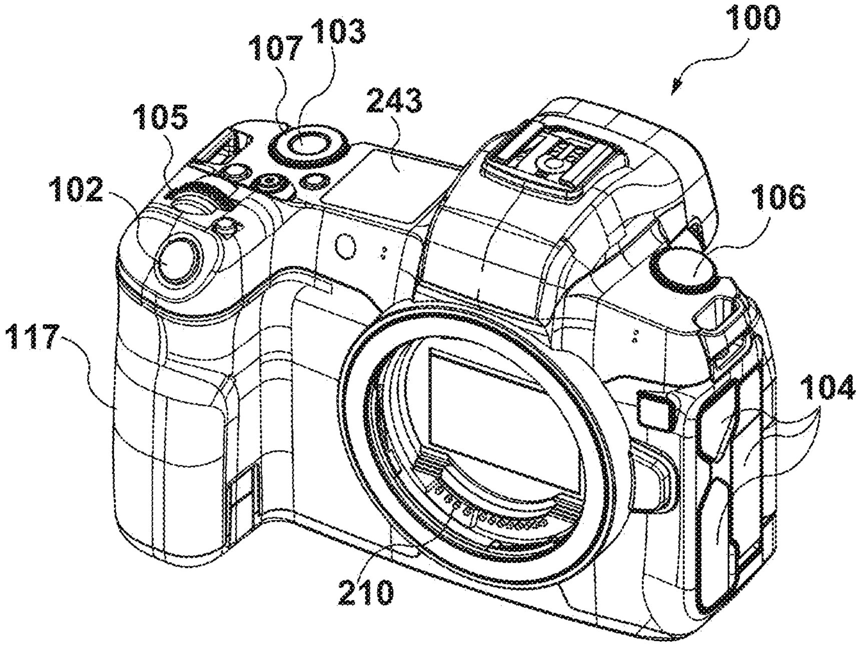
FIG. 1A is an external view showing an apparatus configuration according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

An embodiment in which an image capture apparatus of the present invention is applied to a single-lens reflex digital camera capable of shooting a still image or recording a moving image will be described in detail below with reference to the accompanying drawings. Note that the present embodiment will describe an example of applying the image capture apparatus of the present invention to the digital camera, but the present invention is not limited to this and the present invention is applicable to any apparatus having a camera function. That is, the present invention is also applicable to a tablet device having a camera function, a portable phone, a smartphone as a kind of portable phone, a music player, a game device, an electronic book reader, and the like.

First Embodiment

<Apparatus Configuration>

Figure 1B:
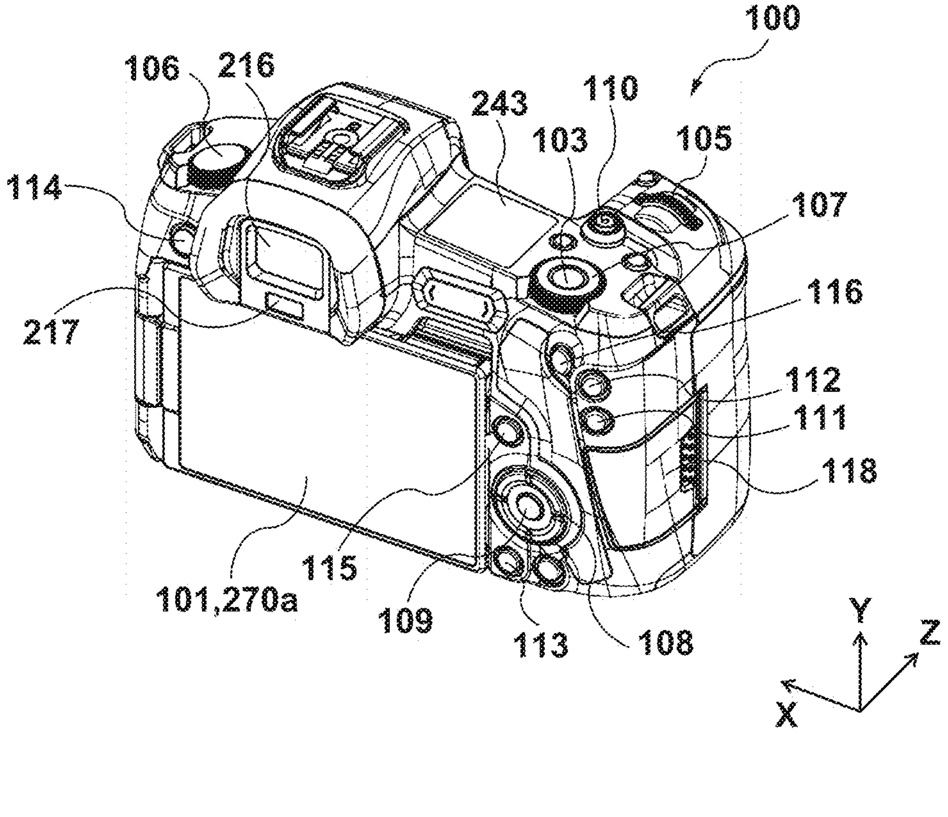
FIG. 1B is an external view showing the apparatus configuration according to the present embodiment.
Figure 2:
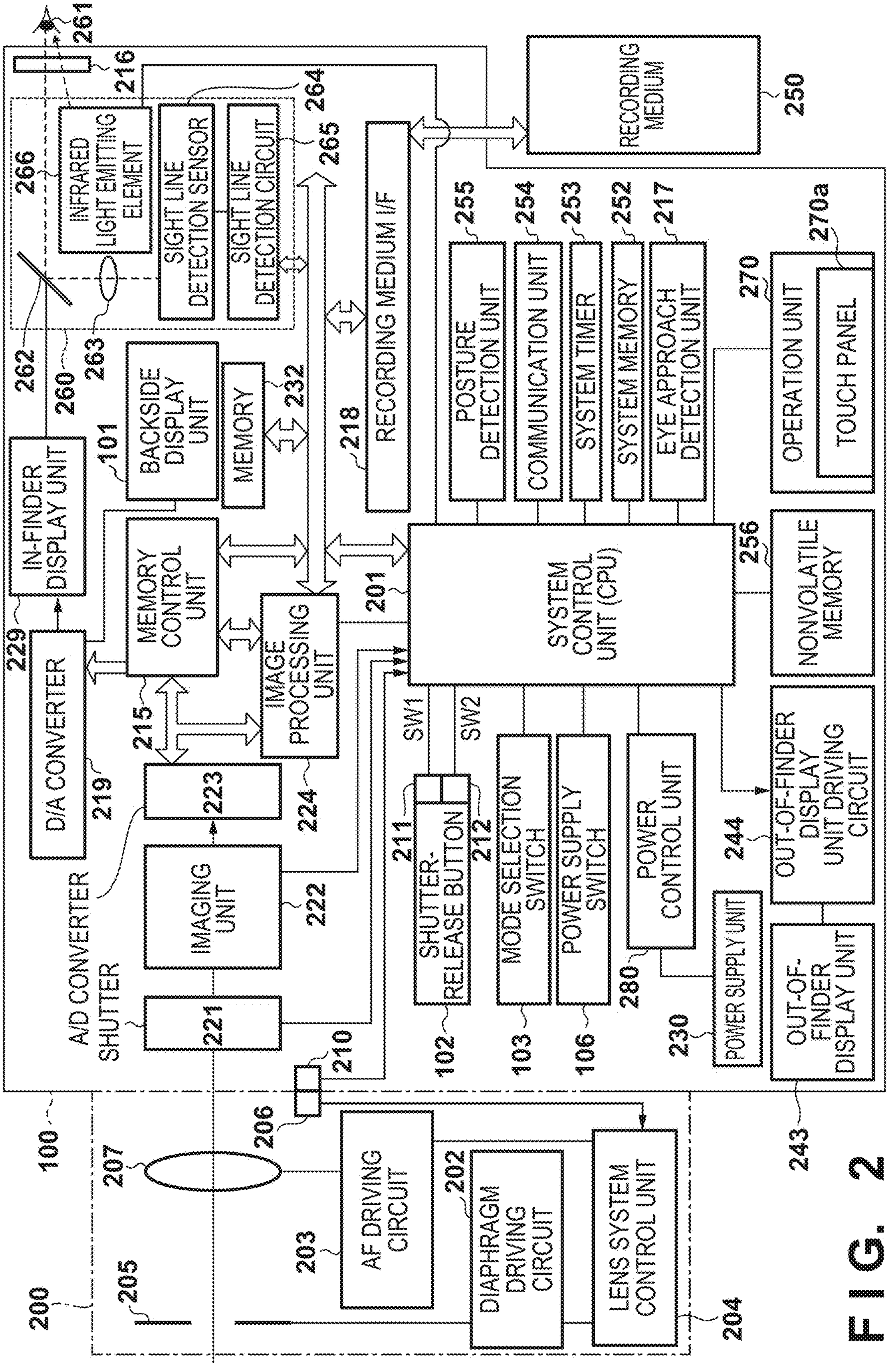
FIG. 2 is a block diagram showing the apparatus configuration according to the present embodiment.

With reference to FIGS. 1A, 1B, and 2, the configuration and functions of a digital camera 100 according to the present embodiment will be described.

FIG. 1A is a front perspective view of the digital camera 100 in a state where a lens unit 200 is detached. FIG. 1B is a back perspective view of the digital camera 100.

In FIGS. 1A and 1B, a backside display unit 101 is a display device such as a liquid crystal panel or an organic EL panel for displaying images and various kinds of information to be visually recognized by the user, which is provided on the back surface of the camera body outside a finder. Moreover, the backside display unit 101 has a function of reproducing a still image after the still image was shot, a function of displaying a moving image that is being recorded, and a live view display function as well. A touch panel 270*a* is provided on the backside display unit 101. The touch panel 270*a* is a touch operation unit capable of detecting contact (touch operation) with the display surface (the operation surface of the touch panel 270*a*) of the backside display unit 101. An out-of-finder display unit 243 is a display device such as a liquid crystal panel or an organic EL panel provided on the upper surface of the camera body, and displays various setting values of the camera such as a shutter speed and a diaphragm aperture.

A shutter-release button 102 is a push button type operation member for giving a shooting instruction. A mode selection switch 103 is a dial type operation member for switching between various modes. The mode selection switch 103 switches the operation mode of a system control unit 201 to any of a still image shooting mode, a moving image recording mode, and a reproduction mode. The still image shooting mode includes an automatic shooting mode, an automatic scene discrimination mode, a manual mode, an aperture-priority mode (Av mode), a shutter speed-priority mode (Tv mode), and a program AE mode (P mode), for example. The still image shooting mode also includes various scene modes each for which shooting scene-specific shooting setting is made, a program AE mode, a custom mode, and/or the like.

The operation mode may directly be switched to any of the plurality of modes included in the still image shooting mode by the mode selection switch 103, or may be switched to any of the plurality of modes included in the still image shooting mode using another operation member after once being switched to the still image shooting mode by the mode selection switch 103. Similarly, also the moving image recording mode and the reproduction mode may include a plurality of modes.

A terminal cover 104 is a cover member for protecting a connector (not illustrated) for connecting an external apparatus and the digital camera 100 via a cable such as a USB cable. A main electronic dial 105 is a rotating operation member included in operation units 270 that will be described later with reference to FIG. 2, and by rotating this main electronic dial 105, setting values such as a shutter speed and a diaphragm aperture can be changed.

A power supply switch 106 is an operation member for switching between on/off of the power supply to the digital camera 100. A sub electronic dial 107 is a rotating operation member that can move a selected frame, scroll images, and/or the like. A cross key 108 is a movement instruction member that can perform an operation corresponding to a pressed portion of the cross key 108 when any of up, down, left, and right buttons of a four-directional button is pressed. A SET button 109 is a push button type operation member that is mainly used for deciding a selection item and/or the like.

A recording button 110 is a push button type operation member that is used to switch between on/off of live view display in the still image shooting mode and to instruct start and stop of moving image shooting (recording) in the moving image recording mode. An enlargement button 111 is a push button type operation member that is used to turn on/off enlarged display during live view display and to change an enlargement ratio during the enlarged display. In addition, the enlargement button 111 is used to enlarge a reproduced image and increase the enlargement ratio in the reproduction mode. By operating the main electronic dial 105 after turning on of the enlargement mode, the live view image can be enlarged or reduced. In the reproduction mode, the main electronic dial 105 functions as an enlargement button for enlarging a reproduced image and increasing an enlargement ratio. An AE lock button 112 is a push button type operation member that can fix an exposure state by being pressed in a shooting standby state.

A reproduction button 113 is a push button type operation member that is used to switch between the shooting mode and the reproduction mode. By pressing the reproduction button 113 during the shooting mode, the operation mode shifts to the reproduction mode, and the latest image among the images recorded on a recording medium 250 can be displayed on the backside display unit 101. A menu button 114 is a push button type operation member that displays, when pressed, a menu screen on which various settings can be made on the backside display unit 101. The user can intuitively perform various settings using the menu screen displayed on the backside display unit 101 as well as the cross key 108 and the SET button 109 or a multi-controller 115.

An AF-ON button 116 is an operation member that can instruct to execute a function of executing AE (Auto Exposure) processing and AF (Auto Focus) processing for a predetermined object in a live view image and a function of switching the target of the AF processing to an object designated by the sight line input of the user. Similar to the shutter-release button 102 that will be described later, the AF-ON button 116 is a push button type operation member that can perform a two-step operation including a first step in which the AF-ON button 116 is turned on to generate a first AF-ON signal SW3 while it is being operated (it is pressed halfway) and a second step in which the AF-ON button 116 is turned on to generate a second AF-ON signal SW4 when the operation is complete (it is pressed fully). The system control unit 201 executes AE processing and AF processing for the object when the AF-ON button 116 undergoes the first operation to the first step, and executes the function of switching to the object designated by the sight line input of the user when the AF-ON button 116 undergoes the operation to the second step continuing from the first step. The functions to be executed in accordance with the operation of pressing the AF-ON button 116 halfway and the operation of pressing the AF-ON button 116 fully can be assigned using the setting screens that will be described later with reference to FIGS. 6A to 6E as well as the cross key 108 and the SET button 109 or the multi-controller 115. Note that functions other than the function of executing AE processing and AF processing and the function of switching the object based on the sight line input can be assigned to the half-pressing operation and the full-pressing operation of the AF-ON button 116. Note that in addition to the AF-ON button 116, the user may be able to set, for another operation member, a function to be executed. With respect to the shutter-release button 102, the function to be executed may be changeable for the half-pressing operation. For example, whether to execute AE processing and AF processing in accordance with the half-pressing operation of the shutter-release button 102 may be changeable by a user setting. However, when the assigned function is changed for the full-pressing operation of the shutter-release button 102 to which the function of shooting recording processing is assigned, it becomes impossible to perform shooting. Therefore, with respect to the full-pressing operation of the shutter-release button 102, the function to be executed (the function to be assigned) is unchangeable by the user.

The system control unit 201 performs display control of the backside display unit 101 and an in-finder display unit 229 as an electronic viewfinder (to be referred to as an EVF hereinafter), that will be described later, in accordance with the above-described various kinds of operation modes.

The eyepiece part 216 is a look-through type eyepiece finder. The user can visually recognize an image displayed on the in-finder display unit 229 through the eyepiece part 216, and can confirm the focus and composition of the captured object image through the lens unit 200.

An eye approach detection unit 217 is arranged near the eyepiece part 216, and can detect approach of any object to the eyepiece part 216. As the eye approach detection unit 217, for example, an infrared proximity sensor is used.

A communication terminal 210 is an electric contact point for the digital camera 100 to perform communication with the lens unit 200 (FIG. 2). A lid 118 is a member for opening or closing a slot for mounting/removing the recording medium 250 to/from the digital camera 100. A grip portion 117 has a shape that makes it easy to be grasped by the right hand of the user when the user holds up the digital camera 100. The shutter-release button 102 and the main electronic dial 105 are arranged at positions where the grip portion 117 can be operated by the index finger of the right hand while holding the digital camera 100 by gripping the grip portion 117 with the little finger, the ring finger and the middle finger of the right hand. In the same state, the sub electronic dial 107 is arranged at a position operable with the thumb of the right hand.

Next, with reference to FIG. 2, the internal configuration of the digital camera 100 and the lens unit 200 of the present embodiment will be described. In FIG. 2, components that are the same as those in FIGS. 1A and 1B are denoted by the same reference numerals.

In FIG. 2, the lens unit 200 is equipped with a shooting lens 207, and is detachable from the digital camera 100. The shooting lens 207 is usually constituted by a plurality of lenses, but is simplified here and is shown by only one lens. A communication terminal 206 is an electric contact point for the lens unit 200 to perform communication with the digital camera 100. The communication terminal 210 is an electric contact point for the digital camera 100 to perform communication with the lens unit 200. The lens unit 200 performs communication with the system control unit 201 via the communication terminal 206, and a built-in lens control unit 204 controls a diaphragm driving circuit 202 so as to drive a diaphragm aperture 205, and controls an AF driving circuit 203 so as to displace the position of the shooting lens 207, thereby bringing the object image in focus.

A focal plane shutter 221 can freely control the exposure time of an imaging unit 222 in accordance with an instruction from the system control unit 201. The imaging unit 222 is an image sensor constituted by an image capturing element such as a CCD or a CMOS for converting the object image into an electrical signal. An A/D converter 223 converts an analog signal of one pixel output from the imaging unit 222 into, for example, a 10-bit digital signal.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined arithmetic processing for photometric processing and ranging processing using the captured image data, and the system control unit 201 performs exposure control and ranging control based on the arithmetic results. Thus, AF processing, AE processing, and EF (flash pre-emission) processing of TTL (Through the Lens) type are performed. Furthermore, the image processing unit 224 performs predetermined arithmetic processing for white balance processing using the captured image data, and AWB (Auto White Balance) processing of TTL type is performed on the basis of the arithmetic results. The image processing unit 224 also performs object detection processing of detecting the type, the body part, and the state (type) of the object, the position and size (region) of the object, and the like using the captured image data. The image processing unit 224 can perform face AF processing or pupil AF processing. The face AF processing is processing of performing AF processing for a face in an image, which has been detected by the object detection processing. The pupil AF processing is processing of performing AF processing for the pupil included in a face in an image, which has been detected by the object detection processing. The system control unit 201 decides a predetermined object automatically or by a user operation from one or a plurality of objects detected by the image processing unit 224, and displays a frame for the predetermined object to indicate the target of AE processing and AF processing.

A memory control unit 215 performs control to exchange of data between the A/D converter 223, the image processing unit 224, and a memory 232. Digital data output from the A/D converter 223 is directly written into the memory 232 via both the image processing unit 224 and the memory control unit 215 or via the memory control unit 215. The memory 232 stores image data obtained from the imaging unit 222 and the A/D converter 223, and image display data for display on the backside display unit 101 or the in-finder display unit 229. The memory 232 has a storage capacity that is sufficient for storing a predetermined number of still images as well as moving images and audio of a predetermined time period. The memory 232 also functions as a memory for image display (video memory).

A D/A converter 219 converts the image display data stored in the memory 232 into an analog signal and supplies the backside display unit 101 or the in-finder display unit 229 with the analog signal. The image data for display that was written into the memory 232 is displayed on the backside display unit 101 or the in-finder display unit 229 via the D/A converter 219. The backside display unit 101 and the in-finder display unit 229 display on the display device in accordance with the analog signal from the D/A converter 219. In this manner, the digital signals stored in the memory 232 are converted into analog signals, and the analog signals are successively transmitted to the backside display unit 101 or the in-finder display unit 229 so as to be displayed thereon, making it possible to function as an electronic view finder (EVF) and to perform live view (LV) image display (through-the-lens image display).

Various setting values of the camera such as a shutter speed and the diaphragm aperture are displayed on the out-of-finder display unit 243 via an out-of-finder display unit driving circuit 244.

A nonvolatile memory 256 is an electrically erasable/recordable memory, and for example, an EEPROM or the like is used. In the nonvolatile memory 256, constants and programs, for example, for operating the system control unit 201 are stored. In this context, "programs" refers to programs for executing flowcharts that will be described later.

The system control unit 201 includes a CPU and an MPU that perform overall control of the entire digital camera 100, and realizes, by executing the programs stored in the nonvolatile memory 256, each process of the flowchart that will be described later. A system memory 252 is, for example, a RAM, and is also used as a working memory where constants and variables for operating the system control unit 201 and the programs read out from the nonvolatile memory 256 are loaded. The system control unit 201 controls the memory

232, the D/A converter 219, the backside display unit 101, the in-finder display unit 229, and/or the like, so as to perform display control. A system timer 253 is a time measurement unit for measuring time periods for various kinds of control operations and the time of an inner clock.

While the shutter-release button 102 provided on the digital camera 100 is being operated, that is, pressed halfway (the shooting preparation instruction), a first shutter switch 211 is turned on and generates a first shutter switch signal SW1. Upon receiving the first shutter switch signal SW1, the system control unit 201 starts AE processing, AF processing, AWB processing, EF processing, and the like by the image processing unit 224.

When the operation of the shutter-release button 102 is completed, that is, the shutter-release button 102 is pressed fully (the shooting instruction), a second shutter switch 212 is turned on and generates a second shutter switch signal SW2. Upon receiving the second shutter switch signal SW2, the system control unit 201 starts a series of recording processing from reading out the signals from the imaging unit 222 to writing the image data to the recording medium 250.

The operation units 270 include operation members such as various switches and buttons for accepting various operations from a user, and notifying the system control unit 201 of the accepted operations, and include at least the following operation members: the shutter-release button 102, the mode selection switch 103, the main electronic dial 105, the power supply switch 106, the sub electronic dial 107, the cross key 108, the SET button 109, the recording button 110, the enlargement button 111, the AE lock button 112, the reproduction button 113, the menu button 114, the multi-controller 115, and the AF-ON button 116.

Note that a desired function can be assigned to each operation member included in the operation units 270 using the menu screen as well as the cross key 108 and the SET button 109 or the multi-controller 115.

A power control unit 280 is constituted by, for example, a battery detection circuit, a DC-DC converter, and a switch circuit for changing over the block to be supplied with power, and detects whether a battery has been inserted or not, the type of the battery, and the residual capacity thereof. Further, the power control unit 280 controls the DC-DC converter in accordance with the detection results and an instruction of the system control unit 201, and supplies a necessary voltage for a necessary length of time to each component including the recording medium 250.

A power supply unit 230 comprises a primary battery such as an alkaline battery or a lithium battery, and a secondary battery such as a NiCd battery, a NiMH battery, or a Li-ion battery, or an AC adaptor. A recording medium I/F 218 is an interface with the recording medium 250 such as a memory card or a hard disk. The recording medium 250 is a recording medium such as a memory card for recording shot images, and is constituted by a semiconductor memory, a magnetic disk, or the like.

A communication unit 254 connects to an external apparatus so as to be capable of communication by a wireless antenna or a wired cable, and transmits and receives images and/or sounds. The communication unit 254 can also connect to a wireless LAN (Local Area Network) and the Internet. The communication unit 254 can transmit image data (including a live view image) captured by the imaging unit 222 and an image file recorded on the recording medium 250 to an external apparatus, and can receive image data or other various kinds of information from the external apparatus. Note that the communication unit 254 is not limited to the wireless LAN, but may use a wireless communication module such as an infrared communication, Bluetooth®, Bluetooth® Low Energy or Wireless USB, or a wired connection unit such as a USB cable, HDMI®, or IEEE 1394.

A posture detection unit 255 detects the posture of the digital camera 100 with respect to the gravity direction. Based on the posture detected by the posture detection unit 255, it is possible to discriminate whether an image shot by the imaging unit 222 has been shot by holding the digital camera 100 in the landscape or portrait orientation. The system control unit 201 can add the orientation information corresponding to the posture detected by the posture detection unit 255 to the image file of the image captured by the imaging unit 222, and rotate and record the captured image. An acceleration sensor, gyro sensor or the like may be used as the posture detection unit 255. The posture detection unit 255 can also detect the movement (pan, tilt, lift, rest, etc.) of the digital camera 100 by using the acceleration sensor or the gyro sensor.

Included among the operation units 270 is also the touch panel 270*a* that is capable of detecting a touch operation on the backside display unit 101. The touch panel 270*a* and the backside display unit 101 can be constructed as a single integrated unit. For example, the touch panel 270*a* is constructed in such a manner that the transmittance of light will not interfere with the display presented by the backside display unit 101, and it is attached to the uppermost layer of the display face of the backside display unit 101. In addition, input coordinates on the touch panel 270*a* and display coordinates on the backside display unit 101 are correlated. As a result, a GUI can be constructed so as to make it possible for the user to directly manipulate the screen displayed on the backside display unit 101. The system control unit 201 is capable of detecting the following operations or states on the touch panel 270*a*.

A finger or a pen, which was not in touch with the touch panel 270*a*, newly touches the touch panel 270*a*, that is, a touch starts (to be referred to as Touch-Down hereinafter).

A state in which the finger or pen is touching the touch panel 270*a* (to be referred to as Touch-On hereinafter).

The finger or pen moves while keeping touching the touch panel 270*a* (to be referred to as Touch-Move hereinafter).

The finger or pen in touch with the touch panel 270*a* is separated, that is, a touch ends (to be referred to as Touch-UP hereinafter).

A state in which nothing is touching the touch panel 270*a* (to be referred to as Touch-Off hereinafter).

When Touch-Down is detected, Touch-On is also simultaneously detected. After Touch-Down, normally, Touch-On is continuously detected unless Touch-Up is detected. Touch-Move is detected while Touch-On is detected. Even while Touch-On is detected, Touch-Move is not detected unless the touch position moves. After Touch-Up of all fingers or pen that was in touch is detected, the state changes to Touch-Off.

The system control unit 201 is notified, via an internal bus, of these operations/states and position coordinates at which the finger or pen is touching the touch panel 270*a*. Based on the notified information, the system control unit 201 determines what kind of operation (touch operation) was performed on the touch panel 270*a*.

With respect to Touch-Move, the moving direction of the finger or pen that moves on the touch panel 270*a* can also be determined based on a change in position coordinates for each vertical component and each horizontal component on the touch panel 270*a*. When Touch-Move of a predetermined distance or more is detected, it is determined that a slide operation (drag) is performed. An operation of quickly moving the finger by a certain distance while touching the touch panel 270*a* and then releasing the finger is called "flick". In other words, "flick" is an operation of quickly tracing on the touch panel 270*a* as if flicking it with the finger. Upon detecting Touch-Move of a predetermined distance or more at a predetermined speed or more and then detecting Touch-Up, it can be determined that the user has performed "flick" (it can be determined that "flick" is performed following "drag"). Furthermore, a touch operation of touching a plurality of portions (for example, two points) at the same time and bringing the touch positions close to each other is called "pinch-in", and a touch operation of moving the touch positions away from each other is called "pinch-out". "Pinch-out" and "pinch-in" are collectively called a pinch operation (or simply pinch).

The touch panel 270*a* may employ any of the following methods: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

The eye approach detection unit 217 detects whether an eye (an object) has approached or contacted (eye approaching) or has moved away from (eye detached) the eyepiece part 216 (approach detection). The system control unit 201 switches the backside display unit 101 and the in-finder display unit 229 between displaying (a display state) and not displaying (a non-display state) in accordance with the state detected by the eye approach detection unit 217. The system control unit 201 sets a display destination as the backside display unit 101 and sets the in-finder display unit 229 to be not displaying during non-eye approach detection at least in a case where the shooting mode and the switching of the display destination are automatic. Further, the system control unit 201 sets the display destination as the in-finder display unit 229 and sets the backside display unit 101 to be not displaying during eye approach detection.

When an object has approached, infrared light irradiated from a light emitting unit (not illustrated) of the eye approach detection unit 217 is reflected and is made to be incident on a light receiving unit (not illustrated) of the infrared proximity sensor. In accordance with an incident light amount of the infrared light received by the infrared proximity sensor, it is possible to detect an approach of some kind of physical object to the eyepiece part 216, and discriminate to what level of distance the object has gotten close to the eyepiece part 216 (an eye approaching distance). Upon detecting an approach of an object to the eyepiece part 216, the system control unit 201 can cause display of the in-finder display unit 229 to start. With this, it is possible for the in-finder display unit 229 to display without delay as much as possible when a user looks through the eyepiece part 216.

In addition, upon detecting that an object has approached within a predetermined distance with respect to the eyepiece part 216 from a non-eye approaching state (no approach state), the eye approach detection unit 217 determines that eye approaching is detected and transmits an eye approach detection notification to the system control unit 201. In addition, when an object for which an approach was detected is apart by the predetermined distance or more from an eye approaching state (approach state), the eye approach detection unit 217 determines that eye separation is detected, and an eye separation detection notification is transmitted to the system control unit 201. A threshold for detecting eye approaching and a threshold for detecting eye separation may be made different such as by providing hysteresis for example. In addition, it is assumed that, after eye approaching is detected, there is an eye approaching state until eye separation is detected. In addition, it is assumed that, after eye separation is detected, there is a non-eye approaching state until eye approaching is detected. With this, the system control unit 201 performs display control of the backside display unit 101 and the in-finder display unit 229 in accordance with an eye approaching state or an eye separation state detected by the eye approach detection unit 217.

Note that the eye approach detection unit 217 is not limited to an infrared proximity sensor, and another sensor may be used when it can detect an approach of an object or an eye to be deemed as eye approaching.

A sight line detection unit 260 includes the following: a dichroic mirror 262, an imaging lens 263, a sight line detection sensor 264, a sight line detection circuit 265, and an infrared light emitting element 266, and detects the position and movement of the sight line of the user in addition to the presence/absence of the sight line on the in-finder display unit 229.

Figure 12:
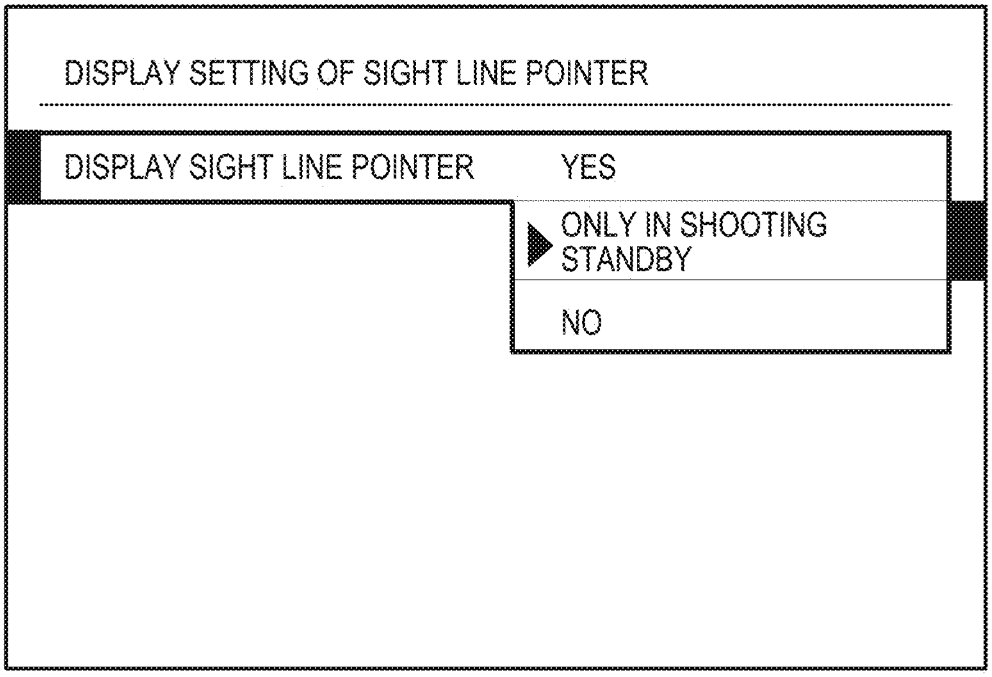
FIG. 12 is a view exemplifying a sight line pointer display setting screen.

The digital camera 100 according to the present embodiment detects the sight line by the sight line detection unit 260 using a method called pupil center corneal reflection. The pupil center corneal reflection is a method of detecting the position and direction of the sight line based on the positional relationship between reflected light obtained when infrared light emitted from the infrared light emitting element 266 is reflected by an eyeball (eye) 261 (more specifically, a cornea) and the pupil of the eyeball (eye) 261. There are other various methods of detecting the position and direction of the sight line, such as a method called scleral reflection that uses the fact that the reflectance of light is different between the iris and the sclera. Note that a sight line detection method other than the above-described ones may be used as long as it is possible to detect the position and direction of the sight line. In the digital camera 100 according to the present embodiment, the display setting of a sight line pointer can be made on the menu screen exemplified in FIG. 12 in a case where the sight line input function is ON. On a sight line pointer display setting screen shown in FIG. 12, the user can operate the operation units 270 to make a setting by selecting the display setting of the sight line pointer from "ON", "only in shooting standby state", and "OFF". When the display setting of the sight line pointer is set to "ON", in a case where the sight line input function is ON, the system control unit 201 performs control to superimpose, on the live view image, the sight line pointer representing the sight line position detected by the sight line detection unit 260 and display the image on the in-finder display unit 229. By displaying the sight line pointer, the user can grasp the currently detected sight line position, and when designating the position by the sight line input function, the user can confirm in advance the position to be designated. When the display setting of the sight line pointer is set to "OFF", the system control unit 201 controls not to display the sight line pointer representing the sight line position. When "only in shooting standby state" is set, the system control unit 201 performs control to display the sight line pointer in a case where the sight line input function is ON. However, while the shooting preparation processing of AF processing and AE processing is executed by, for example, pressing the shutter-release button 102 fully or halfway, the sight line pointer is set in a non-display state even if the sight line is detected by the sight line detection unit 260. That is, control is executed to display the sight line pointer only while AF processing and AE processing are not executed. It is considered that the user views the live view image to confirm whether the object is in focus while AF processing and AE processing are executed. When, however, the sight line pointer is displayed at the sight line position, it is difficult to confirm the object, and thus the setting "only in shooting standby state" of not displaying the sight line pointer while the shooting preparation processing is executed is provided.

The infrared light emitting element 266 is a diode that emits infrared light to detect the sight line position of the user within the finder screen, and emits infrared light toward a portion around the center of the eyepiece part 216 to irradiate the eyeball (eye) 261 of the user. The infrared light emitted from the infrared light emitting element 266 is reflected by the eyeball (eye) 261, and the reflected infrared light reaches the dichroic mirror 262. The dichroic mirror 262 has a function of reflecting only the infrared light and passing through visible light, and the reflected infrared light whose optical path has been changed forms an image on the imaging plane of the sight line detection sensor 264 via the imaging lens 263.

The imaging lens 263 is an optical member forming a sight line detection optical system. The sight line detection sensor 264 includes an image sensor such as a CCD or a CMOS sensor. The sight line detection sensor 264 photoelectrically converts the incident reflected infrared light into an electrical signal, and outputs it to the sight line detection circuit 265. The sight line detection circuit 265 detects the sight line position of the user from the movement of the eyeball (eye) 261 of the user and the position of the pupil based on the output signal of the sight line detection sensor 264, and outputs the detected information to the system control unit 201. Since the sight line detection sensor 264 can detect the pupil of the human eye, even if another object is close to or in contact with the eyepiece part 216, the sight line detection sensor 264 does not detect that the sight line of a person is input. Thus, the eyepiece part 216 has a function as the sight line operation unit, but the sight line detection unit may be a separate component. Note that enabling/disabling of the sight line input function by the sight line detection unit 260 can be, for example, set by the user via the menu screen.

The system control unit 201 can detect the following operations or states on the eyepiece part 216 based on the detection results of the sight line detection unit 260.

- The sight line of the user who has approached the eyepiece part 216 is newly input (detected) (a sight line input starts).
- A state in which the user who has approached the eyepiece part 216 inputs the sight line.
- A state in which the user who has approached the eyepiece part 216 is gazing.
- The user who has approached the eyepiece part 216 turns the input sight line away from the object (a sight line input ends).
- A state in which the user who has approached the eyepiece part 216 inputs no sight line.

The system control unit 201 is notified of the operations/states and the input position of the sight line on the eyepiece part 216, and can determine, based on the notified information, the operation (sight line operation) performed for the eyepiece part 216.

Note that gazing indicates a case where the sight line position of the user does not exceed a predetermined moving amount within a predetermined time. That is, in a case where a period in which the sight line of the user is fixed to a given region exceeds a predetermined threshold based on the detection information received from the sight line detection circuit 265, the system control unit 201 determines that the user is gazing at the region. Therefore, this region can be said to be a gazing position (gazing region) as a position at which the user is gazing. Note that "the sight line is fixed to a given region" indicates that, for example, the average position of the movement of the sight line is within the region until a predetermined period elapses, and a variation (variance) is smaller than a predetermined value.

<Control Processing>

Next, with reference to FIGS. 3A to 6E, control processing of the digital camera 100 according to the first embodiment will be described.

Figure 3A:
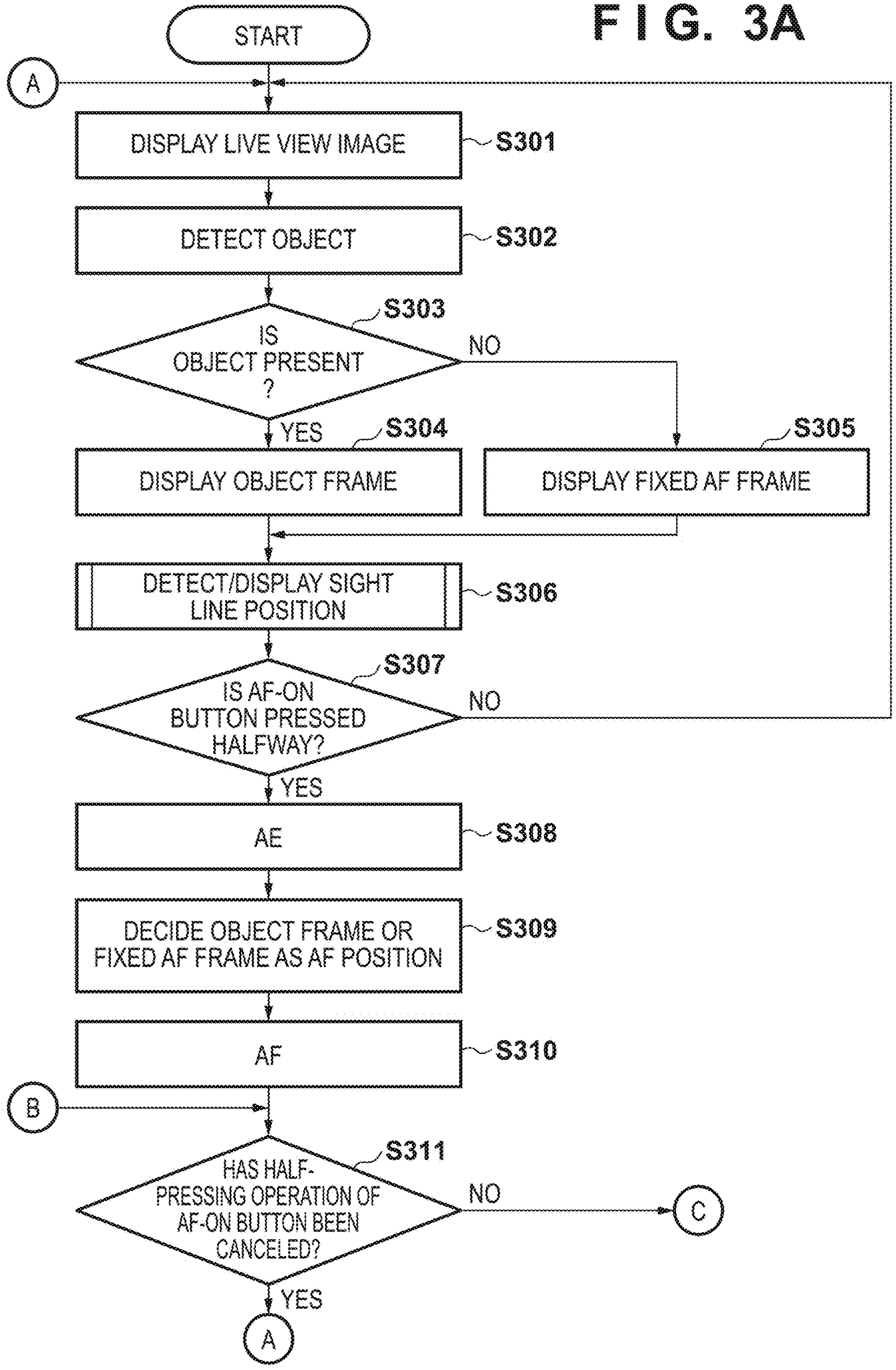
FIG. 3A is a flowchart illustrating control processing according to the first embodiment.
Figure 3B:
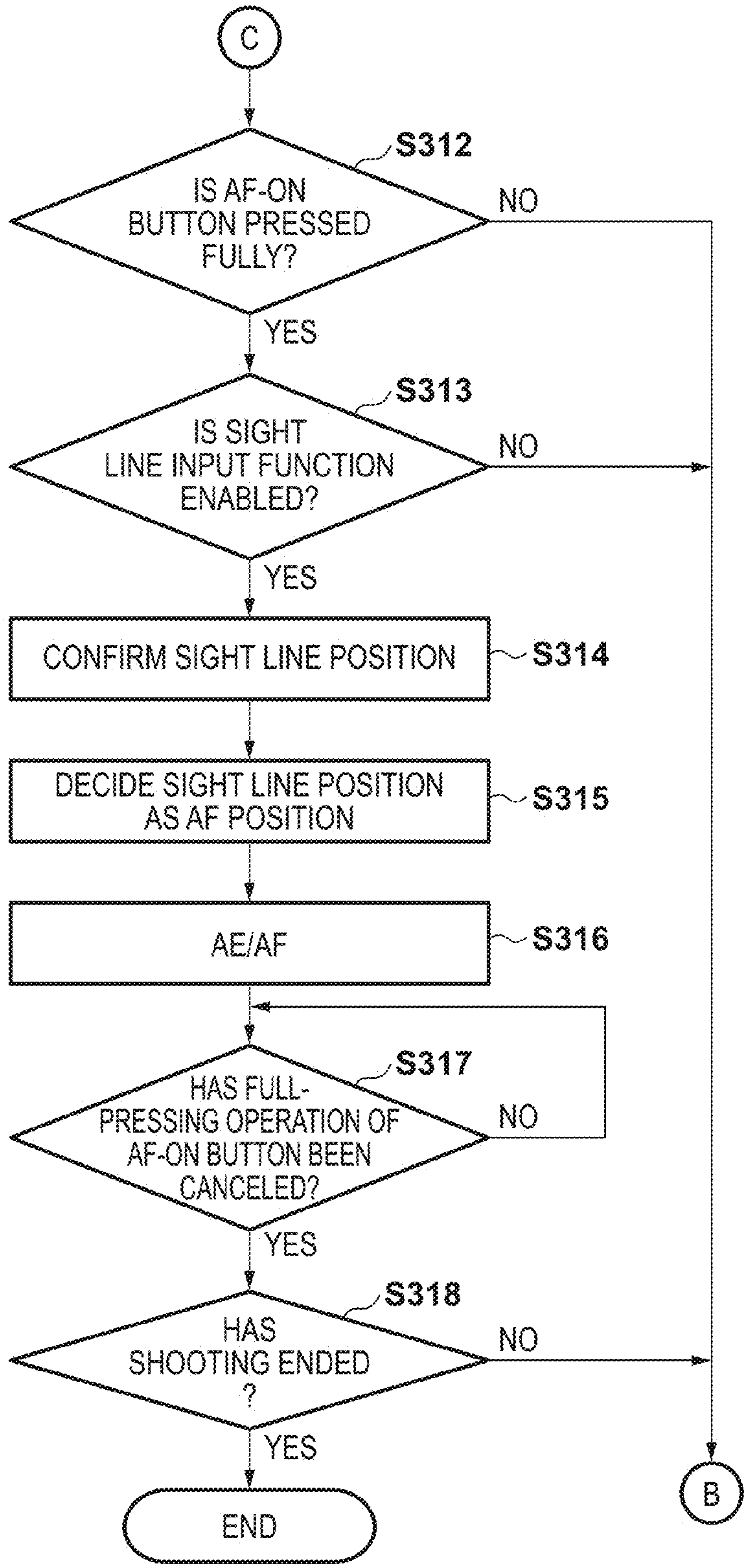
FIG. 3B is a flowchart illustrating the control processing according to the first embodiment.

FIGS. 3A, 3B, 4A, and 4B are flowcharts illustrating the control processing of the digital camera 100 according to the first embodiment. The processing shown in FIGS. 3A and 3B is implemented when the digital camera 100 is powered on and the system control unit 201 controls the respective components by deploying programs stored in the nonvolatile memory 256 to the system memory 252 and executing the programs. Note that the processing shown in FIGS. 3A and 3B may be started not only immediately after the digital camera 100 is activated but also immediately after the operation mode shifts to the still image shooting mode or the moving image recording mode and display of a live view image is started. The processing shown in FIGS. 3A and 3B shows an excerpt of processing related to the operation of the AF-ON button 116 in the shooting standby state (a state in which shooting recording processing by pressing the shutter-release button 102 fully in the shooting mode is not executed). That is, the processing described in the apparatus configuration is also executed in addition to the processing shown in FIGS. 3A and 3B. That is, the system control unit 201 executes the shooting preparation processing such as AE processing, AF processing, AWB processing, and EF processing in accordance with the half-pressing operation (ON of SW1) of the shutter-release button 102. In addition, the system control unit 201 executes recording processing in accordance with the full-pressing operation (ON of SW2) of the shutter-release button 102.

In step S301, the system control unit 201 displays a live view image captured by the imaging unit 222 on the backside display unit 101 while sequentially updating the live view image. The display processing of the live view image is continuously executed during the processing shown in FIGS. 3A and 3B.

In step S302, the system control unit 201 causes the image processing unit 224 to perform object detection processing for the live view image.

In step S303, the system control unit 201 determines whether a predetermined object has been detected by the object detection processing of the image processing unit 224. When it is determined that the predetermined object has been detected, the system control unit 201 advances the processing to step S304. When it is not determined that the predetermined object has been detected, the system control unit 201 advances the processing to step S305.

In step S304, the system control unit 201 receives, from the image processing unit 224, position information of the predetermined object detected in step S302, and displays an object frame to surround the predetermined object in the image displayed on the backside display unit 101. Note that when the user has selected an AF target object by a user operation, for example, an operation of confirming an AF position at a sight line position by the full-pressing operation on the AF-ON button 116 or an operation of designating an AF position by a touch operation on the backside display unit 101, an object frame indicating that the object has been selected may be displayed. Then, in the case of an object automatically selected by the system control unit 201 instead of the object selected by the user, a normal single line object frame is displayed, and in the case of the object selected by the user, a double line object frame is displayed, thereby performing display in a different display form (shape, color, or the like) so as to identify the object that has been selected. In addition, the object selected once by the user may be tracked by the image processing unit 224, and the object frame may be displayed at the tracked object position.

In step S305, the system control unit 201 displays a fixed AF frame of a constant size at the AF position designated by the user using the cross key 108 and the SET button 109, or the multi-controller 115 in the image displayed on the backside display unit 101. Note that when no object is detected in step S302, the system control unit 201 may advance the processing to step S306 without executing the processing in step S305.

In step S306, the system control unit 201 receives information of the sight line position of the user detected by the sight line detection unit 260, and displays the sight line position in the image displayed on the backside display unit 101. Note that when the sight line input function of the digital camera 100 is disabled, the processing in step S306 may be omitted.

In step S307, the system control unit 201 determines whether the AF-ON button 116 is pressed halfway. When the first AF-ON signal SW3 is detected from the AF-ON button 116, the system control unit 201 determines that the AF-ON button 116 is pressed halfway. When it is determined that the AF-ON button 116 is pressed halfway, the system control unit 201 advances the processing to step S308, and when it is determined that the AF-ON button 116 is not pressed halfway, the system control unit 201 returns the processing to step S301.

In step S308, the system control unit 201 executes AE processing by exposure control based on a photometric calculation result obtained by the image processing unit 224.

In step S309, the system control unit 201 causes the image processing unit 224 to decide, as the AF position, the fixed AF frame or the object frame decided as an AF target in the processing of steps S303 to S305. The digital camera 100 according to the first embodiment executes AE/AF processing at a timing when the AF-ON button 116 is pressed halfway or fully, without executing AE/AF processing during steps S301 to S306 in which the AF-ON button 116 is not operated. In addition, the digital camera 100 also executes AE/AF processing at a timing when the shutter-release button 102 is pressed halfway.

In step S310, the system control unit 201 executes AF processing by the ranging control based on the ranging calculation result at the AF position decided by the image processing unit 224 in step S309, and displays, on the backside display unit 101, an AF frame indicating a result of executing the AF processing. The AF frame indicating the result of executing the AF processing is displayed by displaying the AF frame in a color and a shape different from the object frame and the fixed frame. Note that in a case where an AF operation setting is settable on the menu screen and the AF operation setting is set to one-shot (one point) AF, the system control unit 201 performs control to execute the AF processing only once at the timing of pressing the AF-ON button 116 halfway. In a case where the AF operation setting is set to servo AF, the system control unit 201 performs control to continuously execute the AF processing for the decided AF position and update the display of the AF frame indicating the AF result. In a case where the AF operation setting is set to servo AF on the menu screen and object tracking is also set, the system control unit 201 performs control to execute object tracking and execute the AF processing by setting the position of the tracked object as the AF position.

In step S311, the system control unit 201 determines whether the half-pressing operation of the AF-ON button 116 has been canceled, that is, whether the AF-ON button 116 is not operated. When the first AF-ON signal SW3 is not detected from the AF-ON button 116 anymore, the system control unit 201 determines that the half-pressing operation of the AF-ON button 116 has been canceled. When it is determined that the half-pressing operation of the AF-ON button 116 has been canceled, the system control unit 201 returns the processing to step S301. When it is determined that the half-pressing operation of the AF-ON button 116 has not been canceled, the system control unit 201 advances the processing to step S312.

In step S312, the system control unit 201 determines whether the AF-ON button 116 is pressed fully. When the second AF-ON signal SW4 is detected from the AF-ON button 116, the system control unit 201 determines that the AF-ON button 116 is pressed fully. When it is determined that the AF-ON button 116 is pressed fully, the system control unit 201 advances the system control unit 201 advances the processing to step S313. When it is determined that the AF-ON button 116 is not pressed fully, the system control unit 201 returns the processing to step S311.

In step S313, the system control unit 201 determines whether the sight line input function of the digital camera 100 is enabled. When it is determined that the sight line input function is enabled, the system control unit 201 advances the processing to step S314. When it is determined that the sight line input function is not enabled, the system control unit 201 returns the processing to step S311.

In step S314, the system control unit 201 confirms the sight line position detected by the sight line detection unit 260.

In step S315, the system control unit 201 decides, as the AF position, the sight line position confirmed in step S314.

In step S316, the system control unit 201 causes the image processing unit 224 to execute AE processing and AF processing for the object at the AF position decided in step S315, thereby displaying the AF frame on the backside display unit 101. Note that in step S316 as well, the system control unit 201 switches whether to execute the AF processing only once or continuously execute the AF processing, in accordance with whether the AF operation setting is set to one-shot (one point) AF or servo AF, similar to step S310. Furthermore, the system control unit 201 performs control to update the display of the AF frame indicating the AF result, and to execute, when object tracking is set, object tracking and execute the AF processing by setting the position of the tracked object as the AF position.

In step S317, the system control unit 201 determines whether the full-pressing operation of the AF-ON button 116 has been canceled, that is, whether the AF-ON button 116 is pressed halfway. When the second AF-ON signal SW4 is not detected from the AF-ON button 116 anymore, the system control unit 201 determines that the full-pressing operation of the AF-ON button 116 has been canceled. The system control unit 201 stands by until it is determined that the full-pressing operation of the AF-ON button 116 has been canceled. When it is determined that the full-pressing operation of the AF-ON button 116 has been canceled, the system control unit 201 advances the processing to step S318.

In step S318, the system control unit 201 determines whether a shooting operation has ended by, for example, changing the operation mode of the digital camera 100. When it is determined that the shooting operation has ended, the system control unit 201 ends the processing. When it is determined that the shooting operation has not ended, the system control unit 201 returns the processing to step S311.

Note that when it is determined in step S317 that the full-pressing operation of the AF-ON button 116 has been canceled, the processing may advance to step S308, and AE processing and AF processing may be re-executed at the position of the object frame or the fixed AF frame.

When the sight line input function is disabled, even if the AF-ON button 116 is pressed fully in step S312, the AE processing and the AF processing may be continued at the position of the object frame or the fixed AF frame in steps S308 to S310.

The control processing in a case where the sight line input function of the digital camera 100 according to the first embodiment is disabled will be described next with reference to FIGS. 4A and 4B.

In FIG. 3B, when the sight line input function is disabled in step S313, a state immediately after executing AF processing at the position of the object frame or the fixed AF frame by pressing the AF-ON button 116 halfway in steps S307 to S310 is obtained. However, the control processing shown in FIG. 4A or 4B may be executed.

Figure 4A:
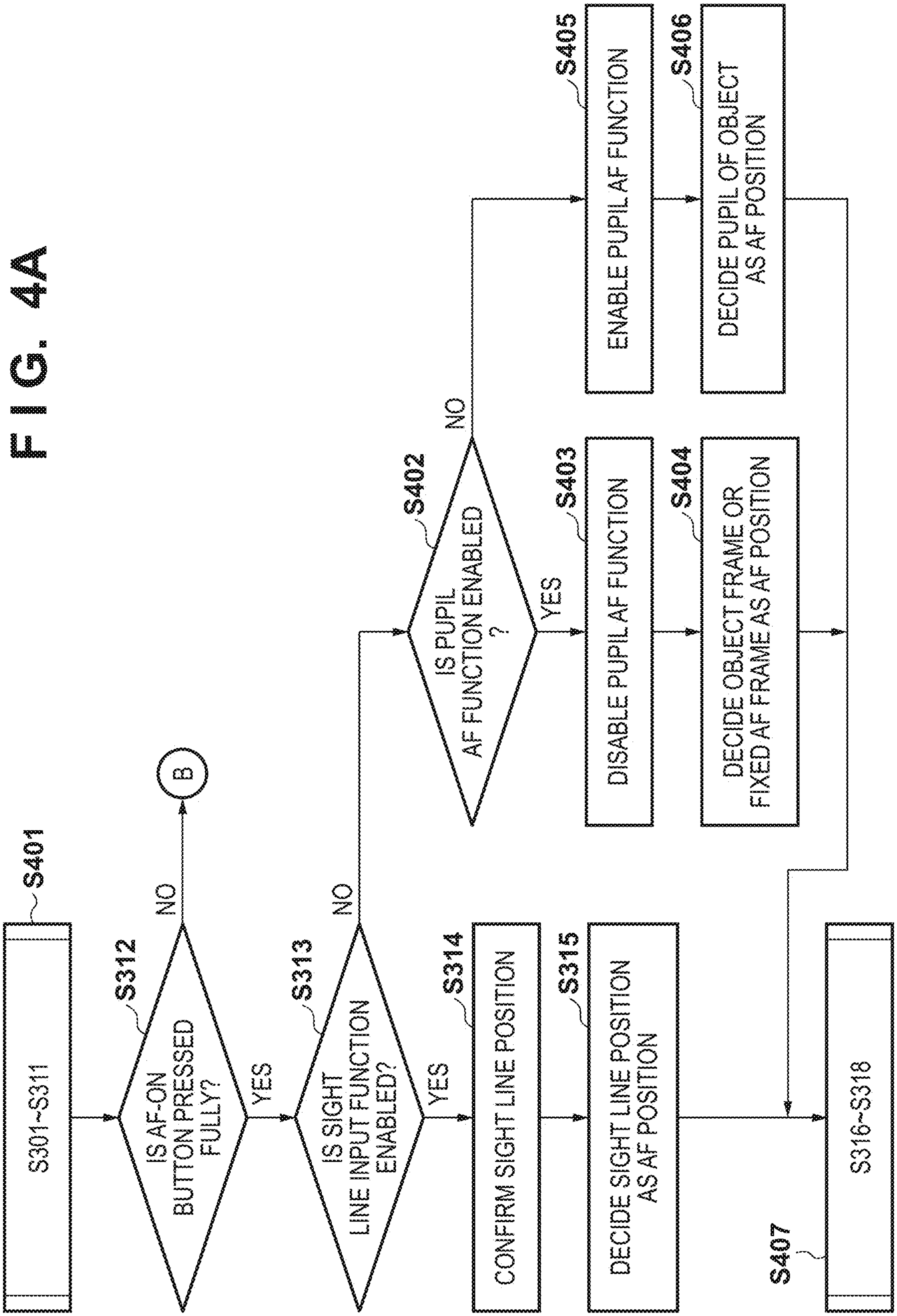
FIG. 4A is a flowchart illustrating the control processing in a case where a sight line input function is disabled according to the first embodiment.

FIG. 4A shows processing of switching between pupil AF and face AF in a case where the sight line input function is disabled in step S313 of FIG. 3B.

In steps S401 and S312, the same processes as in steps S301 to S312 of FIGS. 3A and 3B are performed.

When it is determined in step S313 that the sight line input function of the digital camera 100 is enabled, the system control unit 201 executes processes in step S314 and S315. When it is determined in step S313 that the sight line input function is not enabled, the system control unit 201 advances the processing to step S402.

In step S402, the system control unit 201 determines whether AF processing (pupil AF function) for the pupil of the object is enabled. When it is determined that the pupil AF function is enabled, the system control unit 201 advances the processing to step S403. When it is determined that the pupil AF function is not enabled, the system control unit 201 advances the processing to step S405.

In step S403, the system control unit 201 disables the pupil AF function and enables AF processing (face AF function) for the face (entire face) of the object.

In step S404, the system control unit 201 causes the image processing unit 224 to detect the face of the object, and decides the position of the detected face as the AF position. In step S407, the system control unit 201 executes AE processing and AF processing for the decided AF position, thereby displaying the AF frame on the backside display unit 101. Note that in step S404, not the face of the object but a rectangular region including the entire object may be detected.

In step S405, the system control unit 201 enables the pupil AF function.

In step S406, the system control unit 201 causes the image processing unit 224 to detect the pupil of the object with respect to the object of the object frame, and decides the position of the detected pupil as the AF position. With respect to the decided AF position, the system control unit 201 advances the processing to step S407, and executes AE processing and AF processing (step S316), thereby displaying the AF frame on the backside display unit 101.

In step S407, the same processes as in steps S316 to S318 of FIG. 3B are executed.

Note that in steps S402 to S406, every time the full-pressing operation of the AF-ON button 116 is repeated (after the full-pressing operation of the AF-ON button 116 is canceled, the AF-ON button 116 is pressed fully again), enabling/disabling of the pupil AF function is switched. Therefore, it is possible to execute AF processing while switching the AF position between the face and the pupil of the object. Note that every time the full-pressing operation of the AF-ON button 116 is repeated, the AF position may be switched to any of the face, right eye, and left eye of the object, instead of switching the AF position to any of the face and pupil of the object. Alternatively, every time the full-pressing operation of the AF-ON button 116 is repeated, the AF position may be switched between the right eye and the left eye of the object.

Note that in steps S402 to S406, the pupil AF function may be always disabled, and only while the AF-ON button 116 is pressed fully, the pupil AF function may be enabled to execute AF processing for the pupil of the object.

Figure 4B:
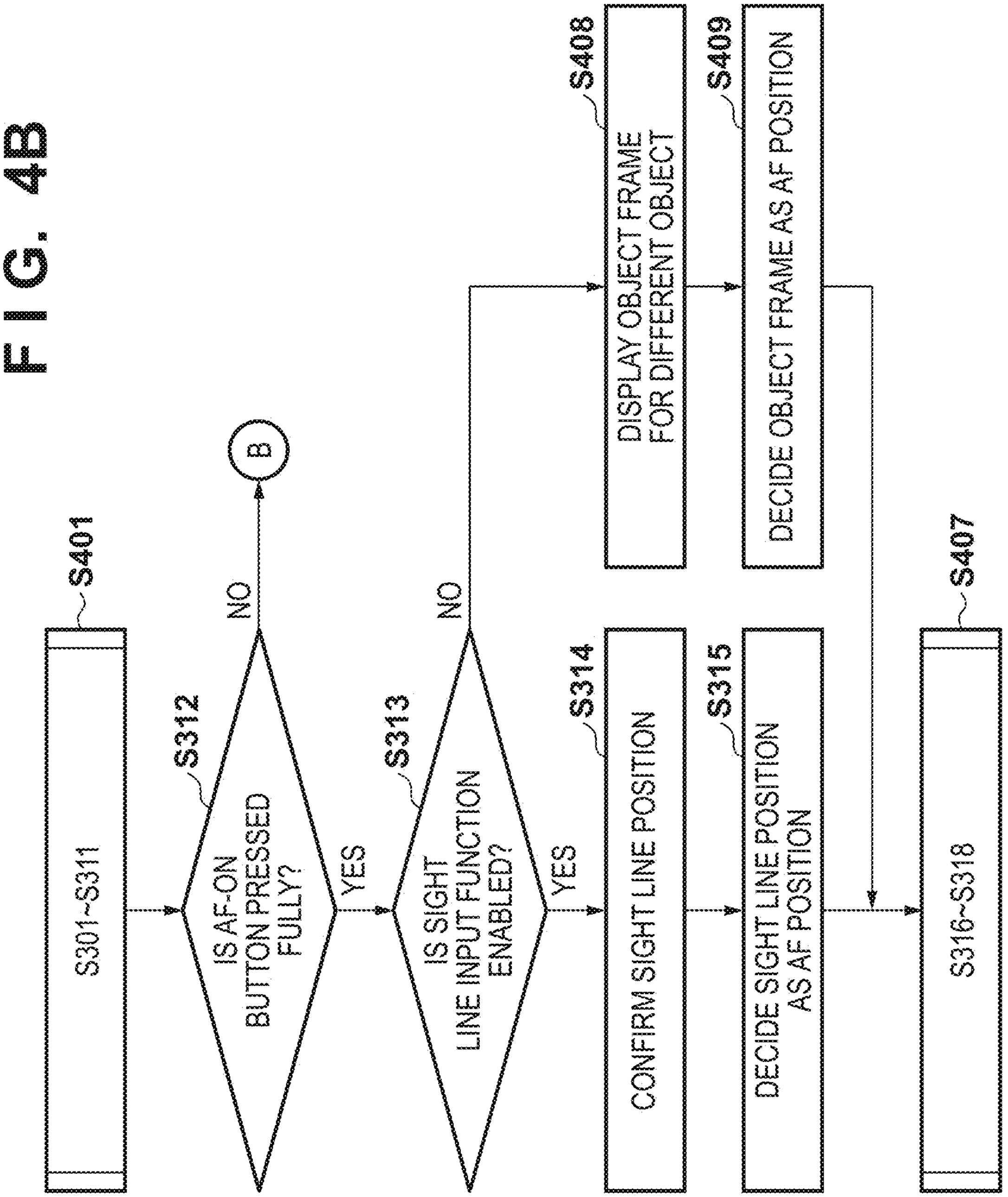
FIG. 4B is a flowchart illustrating the control processing in the case where the sight line input function is disabled according to the first embodiment.

FIG. 4B shows processing of switching the AF target object in a case where the sight line input function is disabled.

In steps S401 and S351, the same processes as in steps S301 to S312 of FIGS. 3A and 3B are executed.

When it is determined in step S313 that the sight line input function of the digital camera 100 is enabled, the system control unit 201 executes processes in step S314 and S315. When it is determined in step S313 that the sight line input function is not enabled, the system control unit 201 advances the processing to step S408.

In step S408, the system control unit 201 searches for the object detected in step S303, and displays the object frame for an object different from the object decided at the AF position in step S309.

In step S409, the system control unit 201 decides, as the AF position, the object frame displayed in step S408. In step S407, the system control unit 201 executes AE processing and AF processing for the decided AF position, thereby displaying the AF frame on the backside display unit 101. Note that in step S408, not the face of the object but a rectangular region including the entire object may be detected.

In step S407, the same processes as in steps S316 to S318 of FIG. 3B are executed.

Note that in steps S408 and S409, while the half-pressing operation and the full-pressing operation of the AF-ON button 116 are repeated, the AF target object may be switched to another object sequentially.

Furthermore, referring to FIGS. 4A and 4B, when the AF-ON button 116 is pressed fully, and the sight line input function is disabled, the processing in steps S402 to S406 or steps S408 and S409 are executed, but the processing may be executed without determining enabling/disabling of the sight line input function.

The control processing according to the first embodiment will be described next using live view screens with reference to FIGS. 5A to 5F.

Figure 5A:
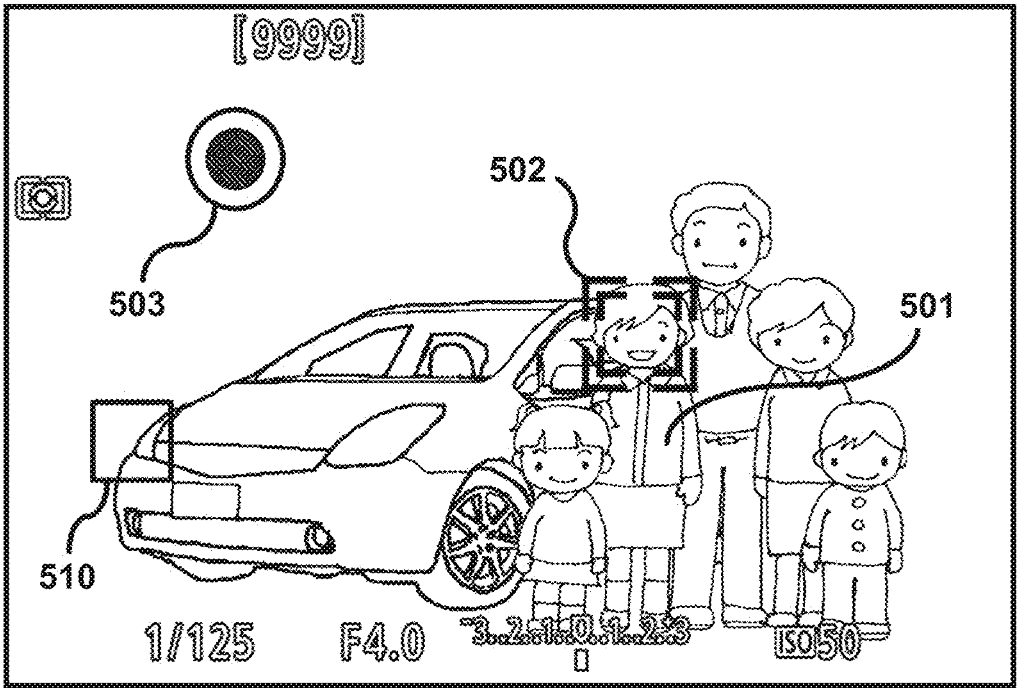
FIG. 5A is a view exemplifying a live view screen for explaining the control processing according to the first embodiment.

In a screen shown in FIG. 5A, a live view image is displayed on the backside display unit 101, the image processing unit 224 detects an object 501, and an object frame 502 is displayed at the position of the face of the object 501. On the screen shown in FIG. 5A, a sight line icon 503 is displayed at the sight line position detected by the sight line detection unit 260.

In the example shown in FIG. 5A, the sight line of the user is near the upper left of the screen. Note that when the sight line input function is disabled, the sight line icon 503 need not be displayed.

In the example shown in FIG. 5A, the object frame 502 is displayed for the object 501. However, when no object can be detected, a fixed AF frame 510 may be displayed at a position designated by the user, or the fixed AF frame 510 may be displayed simultaneously with the object frame 502. Note that the size of the fixed AF frame 510 can arbitrarily be designated by the user.

Figure 5B:
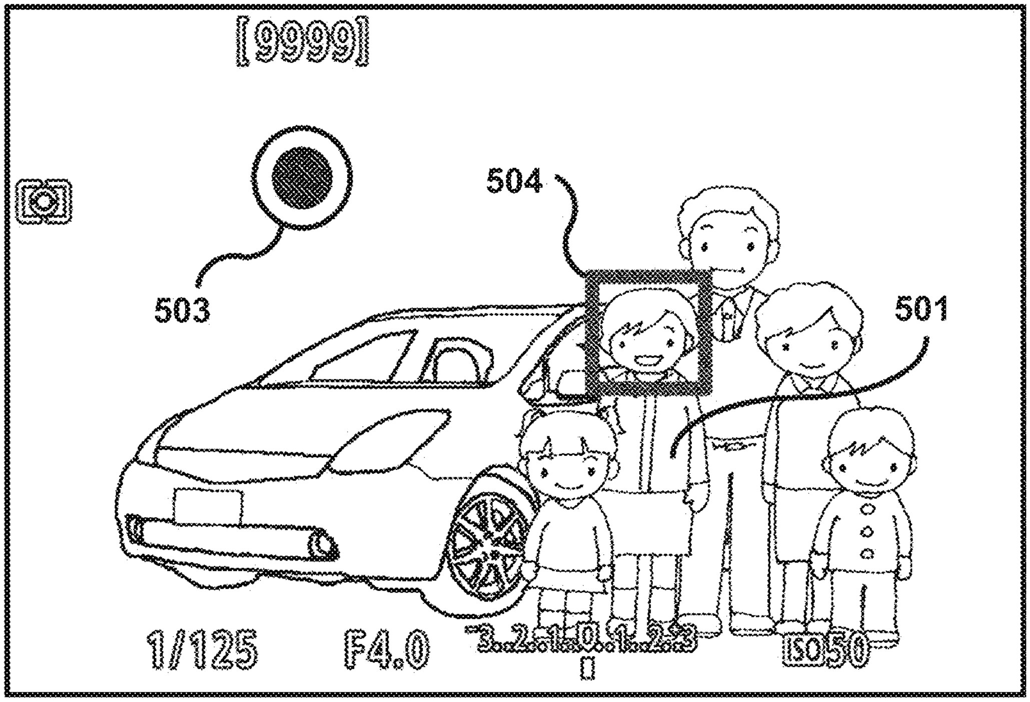
FIG. 5B is a view exemplifying a live view screen for explaining the control processing according to the first embodiment.

A screen shown in FIG. 5B exemplifies a state in which the user presses the AF-ON button 116 halfway on the screen shown in FIG. 5A.

The system control unit 201 causes the image processing unit 224 to execute AE processing and AF processing for the object frame 502 of the object 501, thereby changing the object frame 502 to an AF frame 504.

When no object can be detected, AE processing and AF processing are performed for the frame 510 shown in FIG. 5A, and the AF frame 504 is displayed at the position of the fixed AF frame 510.

During the above processing, the sight line detection processing by the sight line detection unit 260 can always be executed, and the position of the sight line icon 503 is updated in accordance with the sight line position of the user.

In the example shown in FIG. 5B, a state in which the sight line of the user is at the same position as in FIG. 5A is exemplified.

Figure 5C:
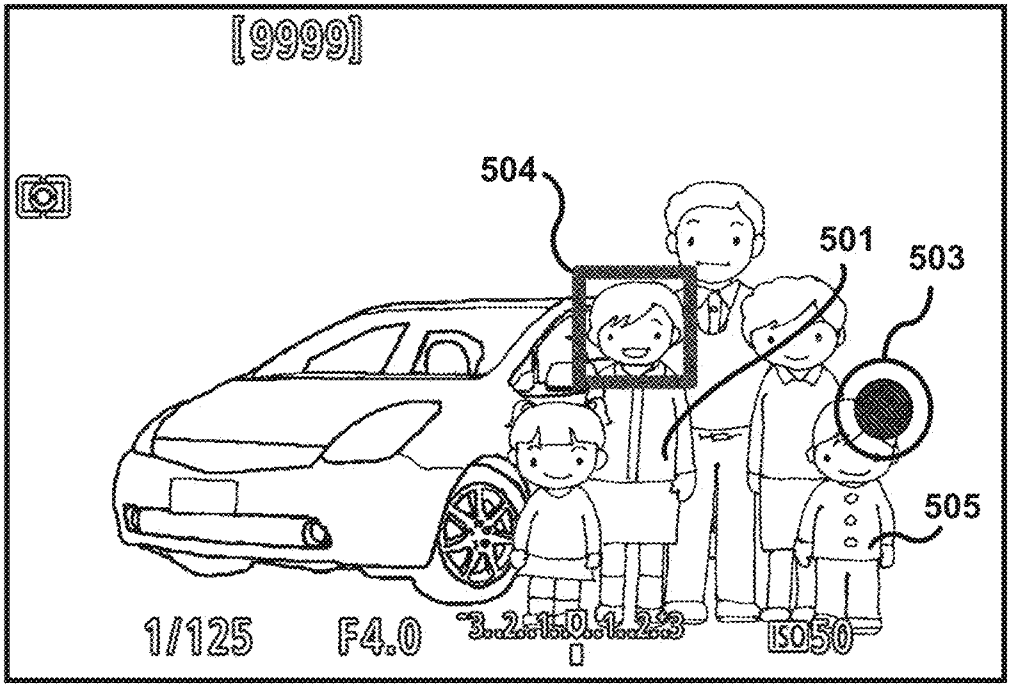
FIG. 5C is a view exemplifying a live view screen for explaining the control processing according to the first embodiment.

A screen shown in FIG. 5C exemplifies a state in which the sight line of the user is changed to an object 505 from the state shown in FIG. 5B.

During a time from FIG. 5B to FIG. 5C, the sight line detection processing by the sight line detection unit 260 can always be executed, similar to the example shown in FIG. 5B.

Unlike the example shown in FIG. 5A, in the example shown in FIG. 5C, the position of the sight line icon 503 moves to the vicinity of the object 505, and the sight line of the user is changed from the object 501 to the other object 505.

Figure 5D:
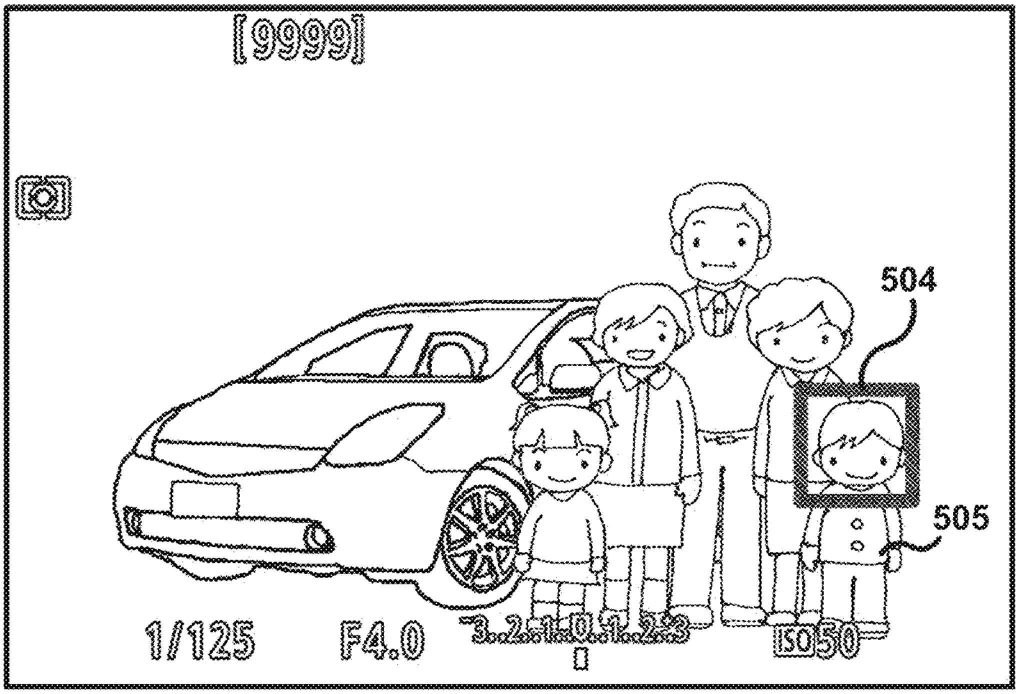
FIG. 5D is a view exemplifying a live view screen for explaining the control processing according to the first embodiment.

A screen shown in FIG. 5D exemplifies a state in which the user presses the AF-ON button 116 fully in the state shown in FIG. 5C.

The system control unit 201 confirms, at the position of the object 505, the sight line position detected by the sight line detection unit 260.

The system control unit 201 causes the image processing unit 224 to execute AE processing and AF processing for the object 505 at the confirmed sight line position, thereby displaying the AF frame 504.

Note that even after executing the AF processing for the object at the sight line position in the state shown in FIG. 5D, the sight line detection processing by the sight line detection unit 260 may be continued and the sight line icon 503 may continuously be displayed.

Figure 5E:
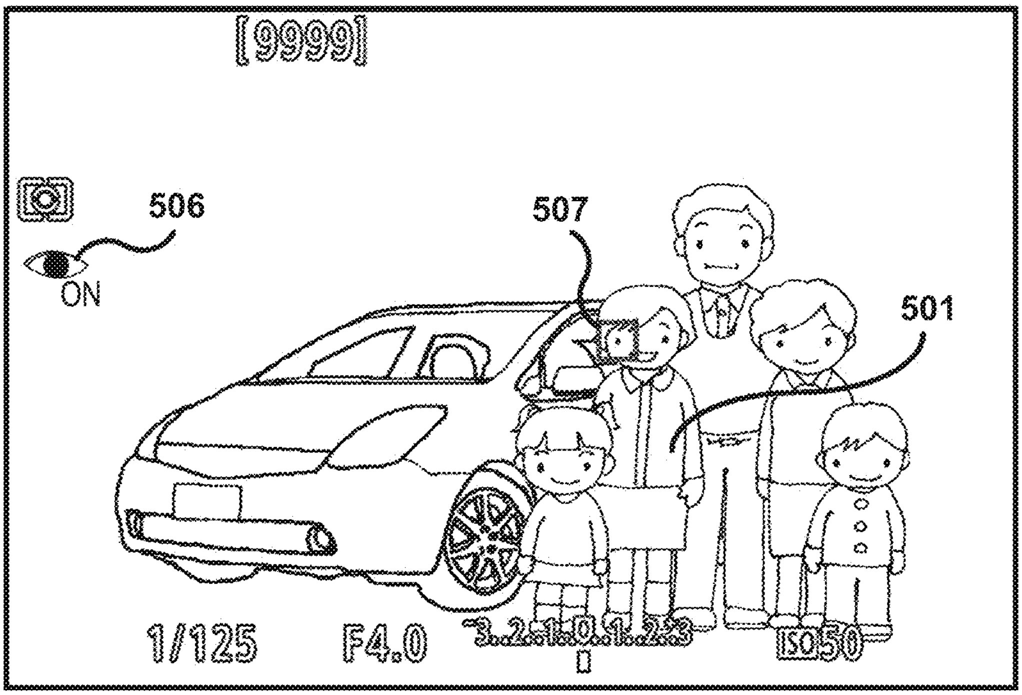
FIG. 5E is a view exemplifying a live view screen for explaining the control processing according to the first embodiment.

A screen shown in FIG. 5E exemplifies a state in which when the AF-ON button 116 is pressed fully, the pupil AF function is enabled and AE processing and AF processing are executed for the pupil of the object 501.

In the example shown in FIG. 5E, a pupil AF icon 506 representing that the pupil AF function is enabled is displayed. In a case where the pupil AF function is disabled, the pupil AF icon 506 need not be displayed and an icon representing that the pupil AF function is disabled may be displayed.

In the example shown in FIG. 5E, a pupil AF frame 507 representing that the AE processing and the AF processing have been executed for the pupil of the object 501 is displayed.

When the sight line input function is disabled in step S402 of FIG. 4A, the system control unit 201 enables the pupil AF function in step S405, and displays the pupil AF icon 506.

The system control unit 201 causes the image processing unit 224 to execute AE processing and AF processing for the pupil of the detected object 501, thereby displaying the pupil AF frame 507.

When the pupil AF function is disabled in step S403 of FIG. 4A, the system control unit 201 causes the image processing unit 224 to execute AE processing and AF processing for the face of the object 501 in step S406 of FIG. 4A, thereby displaying the AF frame 504 for the face of the object 501.

Note that in the state shown in FIG. 5E, the pupil AF function may be executed for the object 501 regardless of whether the sight line input function is enabled or disabled.

Figure 5F:
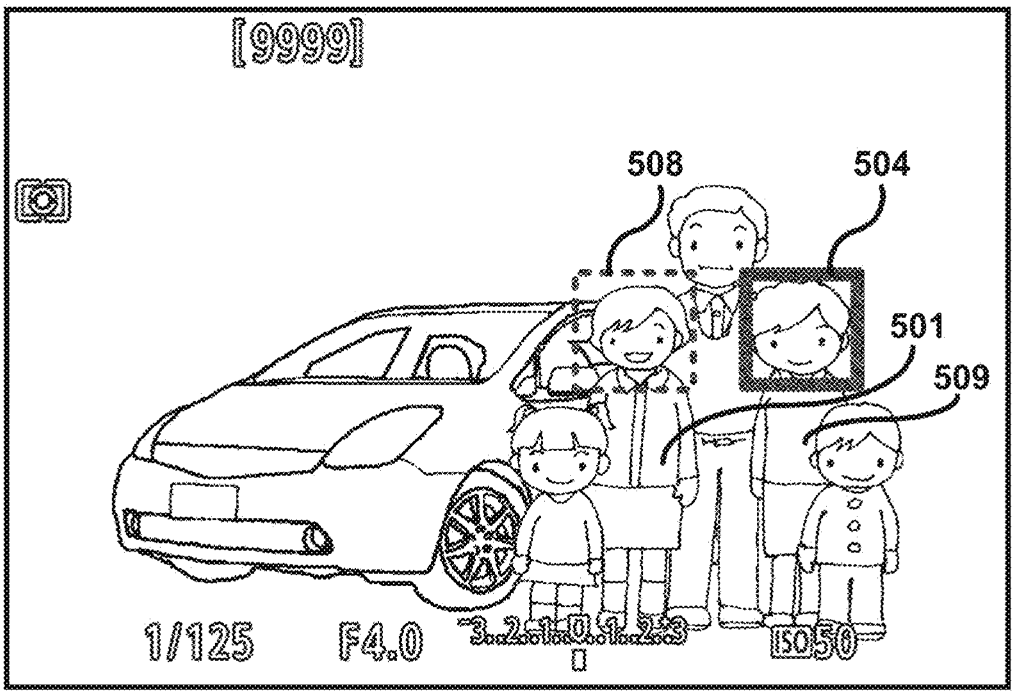
FIG. 5F is a view exemplifying a live view screen for explaining the control processing according to the first embodiment.

A screen shown in FIG. 5F exemplifies a state in which when the AF-ON button 116 is pressed fully, the object is changed from the state in which the AF-ON button 116 is pressed halfway, and AE processing and AF processing are executed.

In the example shown in FIG. 5F, a dotted-line frame 508 is displayed for the face of the object 501 that was at the AF position when the AF-ON button 116 was pressed halfway in step S401 of FIGS. 4A and 4B (steps S307 to S310 of FIG. 3A).

After that, when the AF-ON button 116 is pressed fully in step S312 of FIGS. 4A and 4B, the system control unit 201 searches, from the objects detected by the image processing unit 224, for a candidate of an object different from the object 501. Assume that an object 509 different from the object 501 is found.

In this case, the system control unit 201 causes the image processing unit 224 to execute AE processing and AF processing for the face of the object 509, thereby displaying the AF frame 504.

As described above, the user can switch the AF target object only by pressing the AF-ON button 116 fully.

More specifically, in a case where the sight line input function is enabled, the user can switch the AF target object in accordance with the sight line position of the user only by pressing the AF-ON button 116 fully. In a case where the sight line input function is disabled, it is possible to switch to pupil AF or face AF or switch the AF target object only by pressing the AF-ON button 116 fully.

Note that AE processing and AF processing may be executed while sequentially switching the AF target object by repeating the half-pressing operation and the full-pressing operation of the AF-ON button 116.

A method of assigning a function to the operation member included in the operation units 270 according to the first embodiment will be described next with reference to FIGS. 6A to 6E.

FIGS. 6A to 6E exemplify setting screens for assigning a function to the AF-ON button 116 according to the first embodiment.

As an example of assigning a function to the operation member included in the operation units 270, a method of setting a function that can be executed when pressing the AF-ON button 116 halfway or fully will be described below.

Figure 6A:
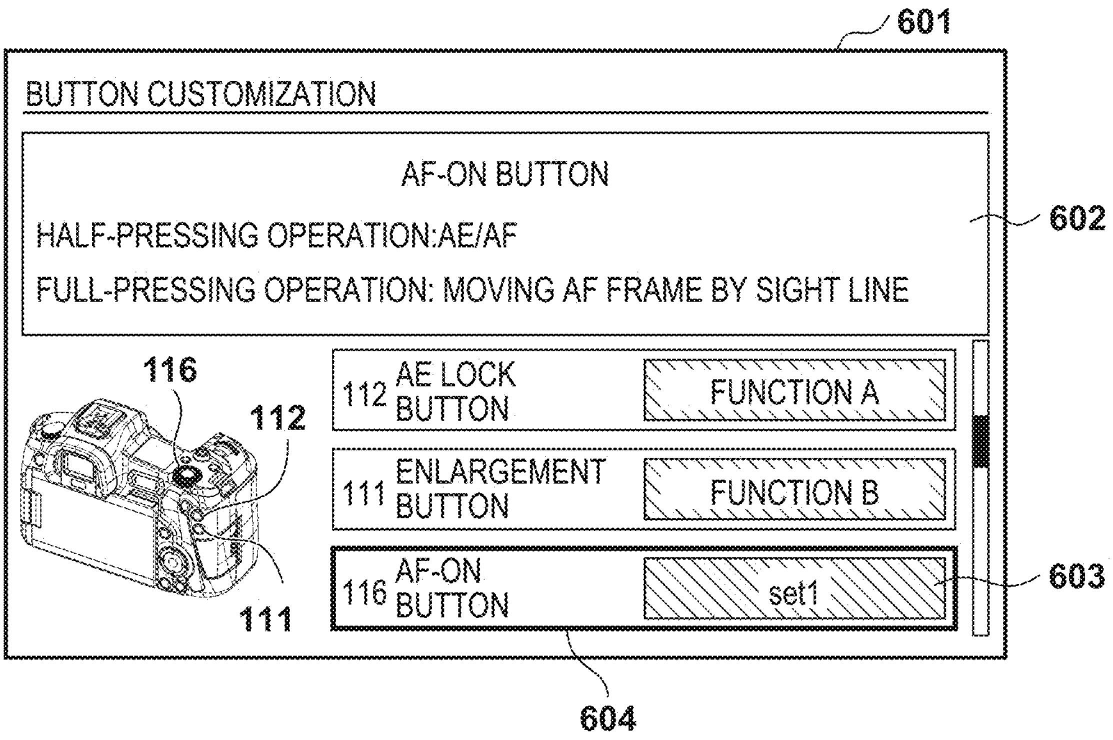
FIG. 6A is a view for explaining a method of assigning a function to an operation member according to the first embodiment.

FIG. 6A exemplifies a setting screen 601 for displaying a list of a function that can be assigned to the AF-ON button 116 and functions assigned to other operation members.

In a display area 602, the name of the operation member corresponding to the position of a cursor 604 moved by the user using the cross key 108 or the multi-controller 115 and the function that can be assigned to the operation member are displayed.

In a display area 603, the name of the operation member and the simplified name of the function assigned to the operation member are displayed.

In the example shown in FIG. 6A, the AF-ON button 116 is selected, the name of the AF-ON button 116 and the name of the current function are displayed in the display area 602, and the cursor 604 is displayed in the display area 603 of the AF-ON button 116.

When the display area 603 at the position of the cursor 604 is touched or the SET button 109 is operated in a state in which the display area 603 at the position of the cursor 604 is selected, a setting screen 605 (FIG. 6B) for setting the function to be assigned to the AF-ON button 116 is displayed.

Figure 6B:
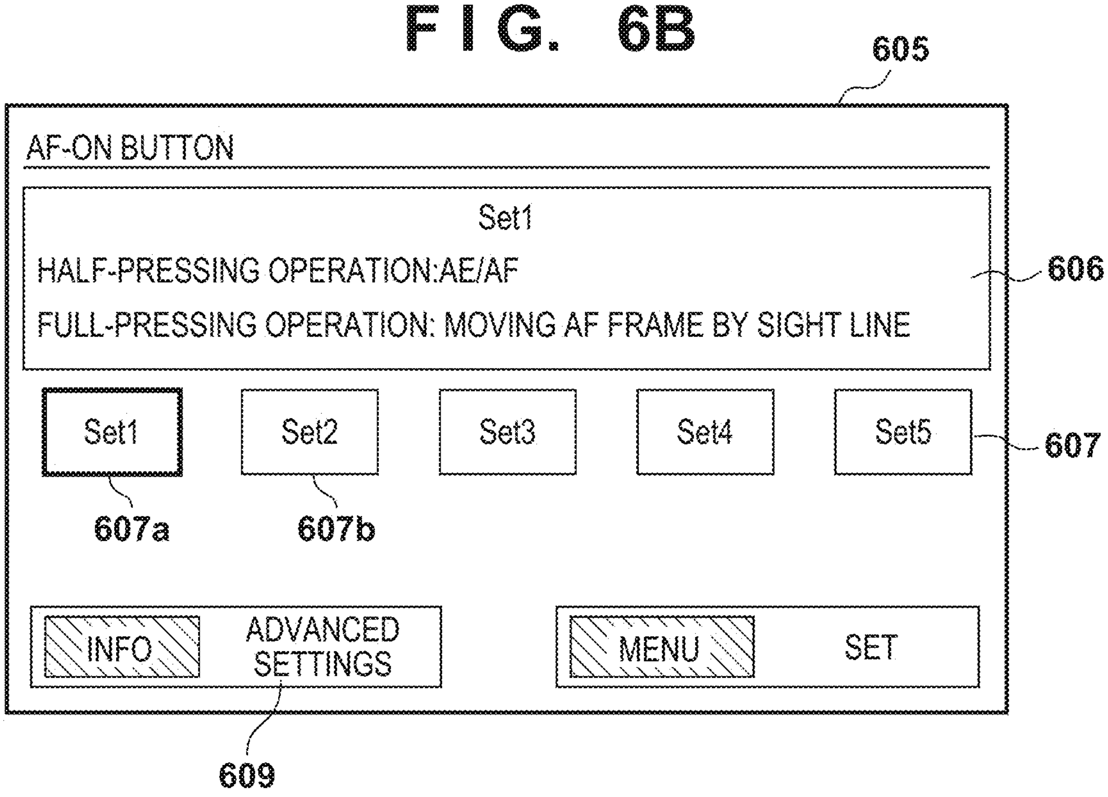
FIG. 6B is a view for explaining the method of assigning the function to the operation member according to the first embodiment.

FIG. 6B exemplifies the setting screen 605 that is displayed when the SET button 109 is operated in the state in which the AF-ON button 116 is selected on the screen shown in FIG. 6A.

In a display area 606, the name (Set1 to Set5) of the function that can be executed when the AF-ON button 116 is pressed halfway or fully and the contents of the function are displayed.

In a display area 607, options each representing a combination of a function executed by the half-pressing operation and a function executed by the full-pressing operation, which can be assigned to the AF-ON button 116, are simply displayed.

When one of the options in the display area 607 is touched or the SET button 109 is operated in a state in which one of the options in the display area 607 is selected, a screen 611 for setting the function executed by pressing the AF-ON button 116 halfway and the function executed by pressing the AF-ON button 116 fully is displayed.

When the cursor is moved from an option 607*a* to an option 607*b* in the display area 607, the display area 606 is updated to the simplified name of the function and the function name corresponding to the option 607*b*.

Figure 6C:
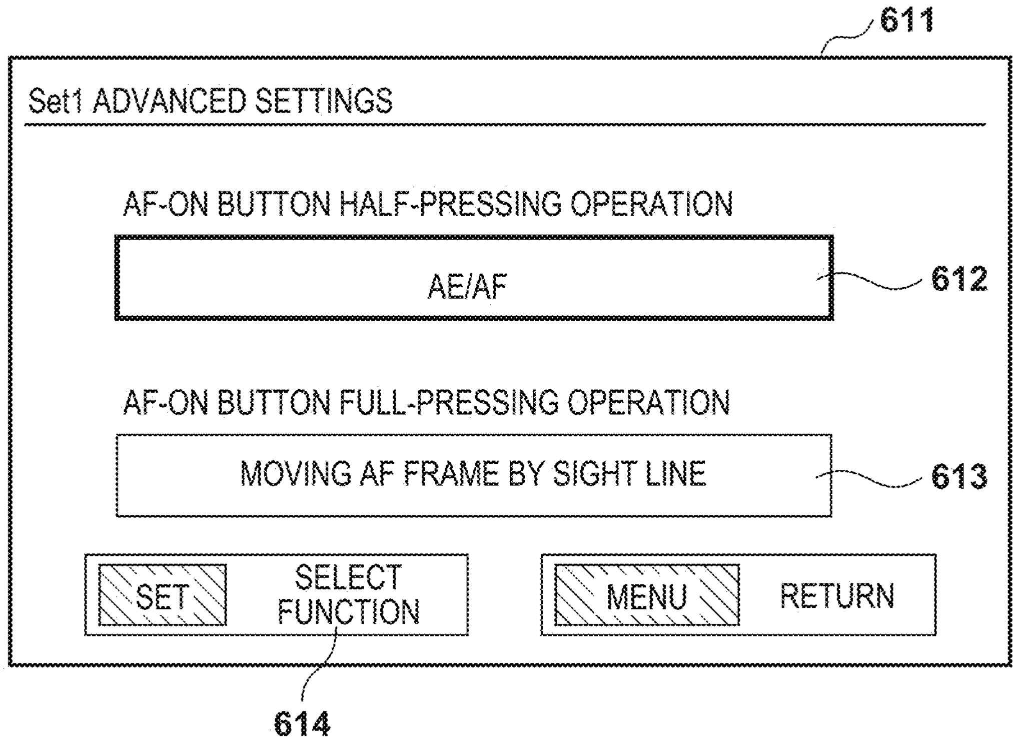
FIG. 6C is a view for explaining the method of assigning the function to the operation member according to the first embodiment.

When setting, for the AF-ON button 116, the function executable by the half-pressing operation and the function executable by the full-pressing operation, the setting screen 611 shown in FIG. 6C is displayed by touching an INFO button 609 while the cursor 604 is on the option 607*a*.

FIG. 6C exemplifies the setting screen 611 for setting, for the AF-ON button 116, the function executable by the half-pressing operation and the function executable by the full-pressing operation.

A function display area 612 of the half-pressing operation of the AF-ON button 116 and a function display area 613 of the full-pressing operation of the AF-ON button 116 are displayed on the screen 611, and can each be selected by moving the cursor 604 using the multi-controller 115 or the cross key 108.

In the function display area 612, it is possible to confirm the function to be executed when pressing the AF-ON button 116 halfway. In the function display area 613, it is possible to confirm the function to be executed when pressing the AF-ON button 116 fully.

In the example shown in FIG. 6C, "AE processing and AF processing" is set as the function to be executed when pressing the AF-ON button 116 halfway, and "moving AF frame by sight line" is set as the function to be executed when pressing the AF-ON button 116 fully.

Figure 6D:
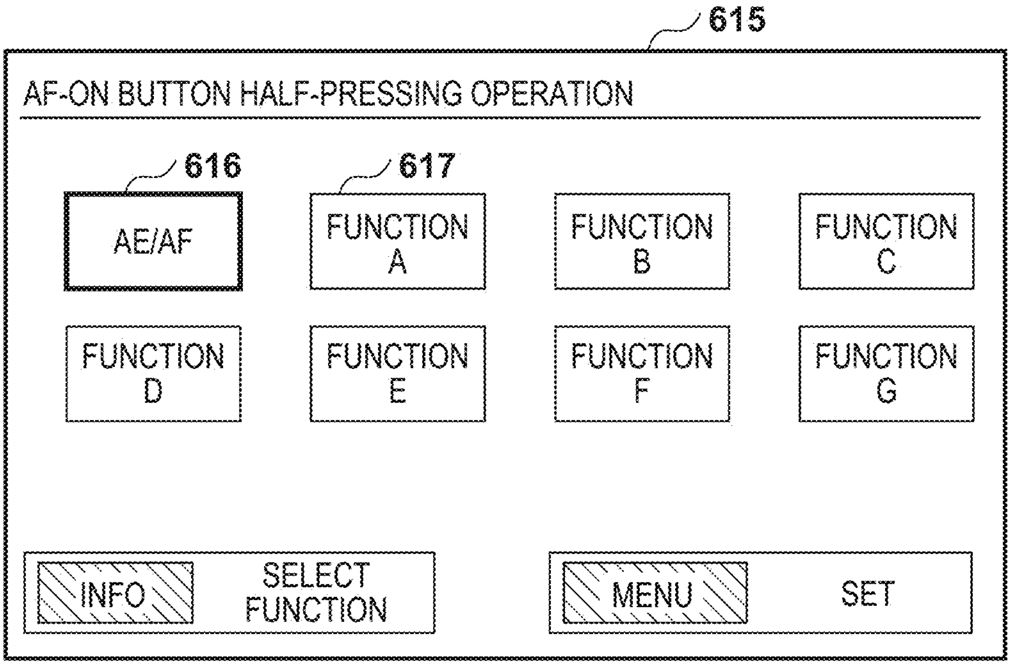
FIG. 6D is a view for explaining the method of assigning the function to the operation member according to the first embodiment.

When the cursor 604 is moved over the function display area 612, and a function selection touch button 614 is touched or the SET button 109 is operated, a screen 615 for selecting a function to be executed is displayed, as shown in FIG. 6D.

FIG. 6D exemplifies the screen for selecting a function to be executed by pressing the AF-ON button 116 halfway.

Note that when the cursor 604 is moved over the function display area 613 on the screen shown in FIG. 6C, and the function selection touch button 614 or the SET button 109 is operated, a screen, similar to that shown in FIG. 6D, for selecting a function to be executed by pressing the AF-ON button 116 fully is displayed.

In the example shown in FIG. 6D, the cursor is on an option 616, and "AE processing and AF processing" of the option 616 is selected for the half-pressing operation of the AF-ON button 116.

For example, when the cursor is moved to "function A" of an option 617 on the screen 615 shown in FIG. 6D, it is possible to make a setting of executing "function A" of the option 617 by pressing the AF-ON button 116 halfway.

Note that in the first embodiment, when the cursor 604 is moved to select the AF-ON button 116 on the screen 601 shown in FIG. 6A, the screen 605 shown in FIG. 6B is displayed and the combination of the function executed by the half-pressing operation and the function executed by the full-pressing operation, which can be assigned to the AF-ON button 116, can be selected. However, the screen 611 shown in FIG. 6C may be displayed from the screen 601 shown in FIG. 6A without intervention of the screen 605 shown in FIG. 6B.

Figure 6E:
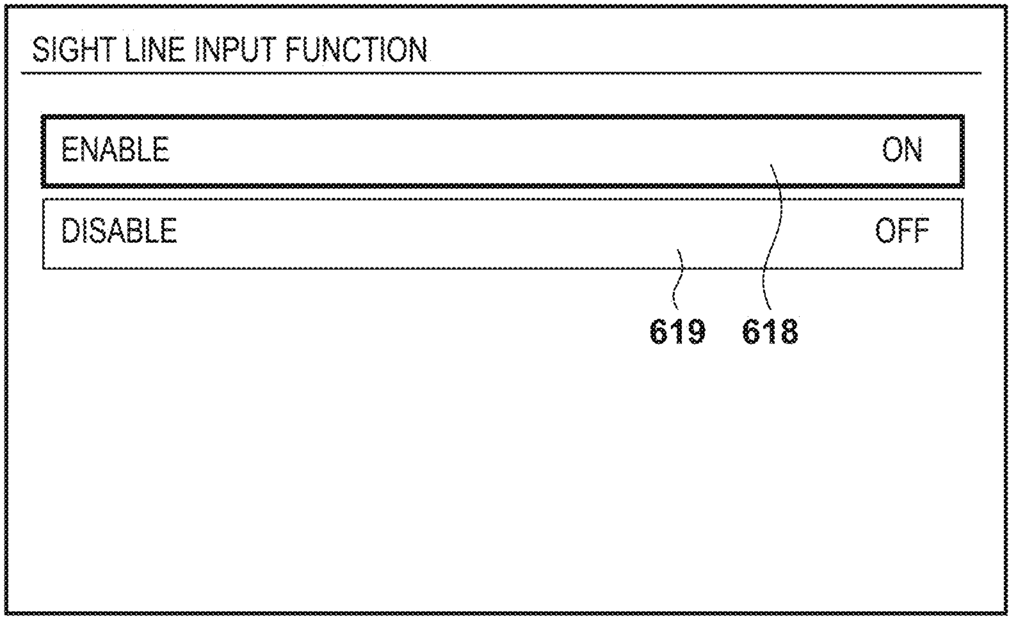
FIG. 6E is a view for explaining the method of assigning the function to the operation member according to the first embodiment.

FIG. 6E exemplifies a screen for enabling or disabling the sight line input function.

When "enabling" of an option 618 is selected, the sight line input function can be enabled to execute the sight line detection processing by the sight line detection unit 260. When "disabling" of an option 619 is selected, the sight line input function can be disabled not to execute the sight line detection processing by the sight line detection unit 260.

In the first embodiment, in a case where the option 619 is selected, since the sight line input function is disabled even if the AF-ON button 116 is pressed fully, AE processing and AF processing can be executed by switching enabling or disabling of the pupil AF function or switching the AF target object, as described with reference to FIGS. 4A and 4B.

As described above, according to the first embodiment, by pressing the AF-ON button 116 halfway or fully, the function of executing AF (Auto Focus) processing and AE (Auto Exposure) processing for an object in a live view image and the function of switching the AF target to an object designated by the sight line input of the user can appropriately be used. In this way, it is possible to instruct different functions related to AF processing by the half-pressing operation and the full-pressing operation of the AF-ON button 116, thereby reducing the number of steps of the operation.

Second Embodiment

According to the second embodiment, the user can set not only a function to be executed by pressing an AF-ON button 116 fully but also a function to be executed by pressing the AF-ON button 116 halfway. Since an apparatus configuration according to the second embodiment is the same as in the first embodiment, and control processing according to the second embodiment is partially the same as in the first embodiment, the same reference symbols denote the same processes, and a description thereof will be omitted.

Assignment of a function to the AF-ON button 116 on a menu screen will be described with reference to FIGS. 7A to 9F.

FIG. 7A exemplifies a function assignment setting screen 700 of the AF-ON button 116.

On the function assignment setting screen 700 of the AF-ON button 116, items 721 to 727 are displayed as setting items with which a function can be assigned to the AF-ON button 116. In addition, a cursor 701 indicating a selected item, a setting content display region 710 of the selected item, an advanced setting icon 702, and an OK icon 703 are displayed.

On the function assignment setting screen 700 of the AF-ON button 116, the user can operate a cross key 108 to move the cursor 701 to one of the items 721 to 727, thereby changing the selected item. The items 721 to 727 correspond to AFON1 to AFON7, respectively, and a combination of functions assigned to the half-pressing operation and the full-pressing operation of the AF-ON button 116 is decided in advance for each of AFON1 to AFON7, as shown in FIG. 7B. Note that in FIG. 7B, with respect to the AF-ON button half-pressing operation of AFON1 and the AF-ON button full-pressing operation of AFON2 for which "user setting" is set, "photometry/AF start" is set as a default setting, but the assigned function can be changed by user selection. Since the user can set functions to be assigned to the AF-ON button half-pressing operation and AF-ON button full-pressing operation from the combinations of AFON1 to AFON7, the user can readily set functions to be assigned to the two operations.

In the setting content display region 710, a function 711 assigned to the AF-ON button half-pressing operation and a function 712 assigned to the AF-ON button full-pressing operation are displayed when the selected item is displayed. Each of the functions 711 and 712 is normally displayed in a case where the function is changeable by a user setting and is grayed out discriminately in a case where the function is unchangeable. In this embodiment, the unchangeable function is grayed out discriminately, but may be discriminately displayed by another method (for example, in a case where the function is changeable, an icon indicating that the function is changeable is additionally displayed).

In FIG. 7A, AFON1 (item 721) is selected by the cursor 701, in which "user setting" is set for the AF-ON button half-pressing operation and "disabled" is set for the AF-ON button full-pressing operation. Therefore, the item 712 is grayed out to indicate "disabled". The item 711 is not grayed out but normally displayed since the user can select, for the AF-ON button half-pressing operation, the function to be assigned. As the function name, "photometry/AF start" as a default setting for a user setting is displayed.

The advanced setting icon 702 indicates to proceed to advanced settings by pressing an INFO button (not shown) of a digital camera 100, and it is possible to proceed to advanced settings by performing a touch operation on the advanced setting icon 702. When the INFO button is pressed or a touch operation is performed on the advanced setting icon 702, an advanced setting screen for the selected item is displayed. The advanced setting screen will be described later with reference to FIGS. 8A to 8D and 9A to 9F.

The OK icon 703 indicates to set the functions to be assigned to the AF-ON button half-pressing operation and the AF-ON button full-pressing operation by pressing a SET button 109 or performing a touch operation on the OK icon 703.

When the SET button 109 is pressed or a touch operation is performed on the OK icon 703, a system control unit 201 assigns the functions corresponding to the selected item, that is, the functions displayed in the setting content display region 710 to the AF-ON button half-pressing operation and the AF-ON button full-pressing operation.

Figure 8A:
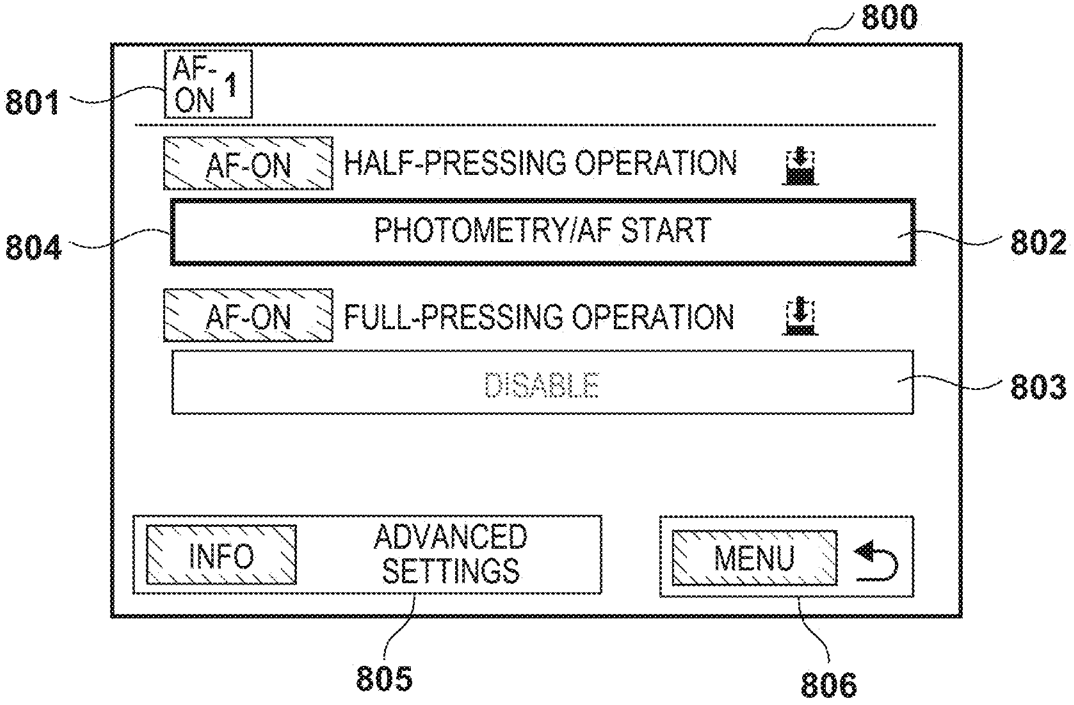
FIG. 8A is a view for explaining the method of assigning the function to the operation member according to the second embodiment.
Figure 8B:
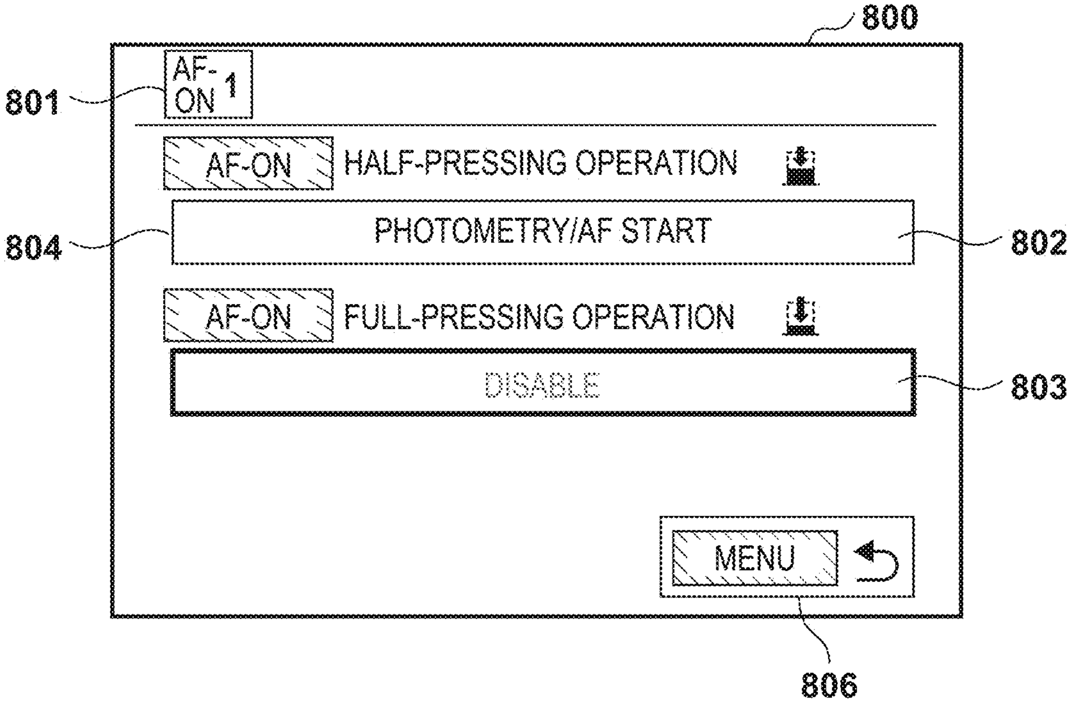
FIG. 8B is a view for explaining the method of assigning the function to the operation member according to the second embodiment.

FIGS. 8A and 8B each exemplify the advanced setting screen of AFON1 (item 721).

Basically, an item name 801 as an advanced setting target, functions 802 and 803 that are assigned to the AF-ON button half-pressing operation and the AF-ON button full-pressing operation, respectively, when an item as an advanced setting target is set, a cursor 804, an advanced setting icon 805, and a return icon 806 are displayed on the advanced setting screen of AFON1 to AFON7.

FIGS. 8A and 8B each show the advanced setting screen of AFON1, and thus an icon representing AFON1 is displayed as the item name 801. The "photometry/AF start" function as a default setting is displayed as the function 802 of the half-pressing operation, and "disabled" is displayed as the function 803 of the full-pressing operation. The function 802 of the half-pressing operation of AFON1 is changeable by a user setting, and is thus normally displayed. To the contrary, "disabled", which is the function 803 of the full-pressing operation, is an unchangeable fixed setting, and is thus grayed out. The cursor 804 indicates which of the function 802 of the half-pressing operation and the function 803 of the full-pressing operation is currently selected, and the selection of the function 802 of the half-pressing operation or the function 803 of the full-pressing operation can be changed by an operation on the cross key 108 or a touch operation. When the INFO button is pressed or the advanced setting icon 805 is touched, when the function currently selected by the cursor 804 is changeable by a user setting, the screen transitions to a function change screen shown in FIG. 8C. That is, as shown in FIGS. 8A and 8B, in the case of AFON1, when the INFO button is pressed or the advanced setting icon 805 is touched while the function 802 of the half-pressing operation that can be changed by a user setting is selected, as shown in FIG. 8A, the screen transitions to the function change screen. However, even if the INFO button is pressed while the function 803 of the full-pressing operation that cannot be changed by a user setting is selected, as shown in FIG. 8B, the screen does not transition to the function change screen. When the item that cannot be changed by a user setting is selected, the screen cannot transition to the function change screen, and thus the advanced setting icon 805 may be in a non-display state, as shown in FIG. 8B. Furthermore, when a menu button 114 is pressed or a touch operation is performed on the return icon 806 on the advanced setting screen, the settings on the advanced setting screen are confirmed (setting target), and the screen returns to the previous screen (the function assignment setting screen 700 of the AF-ON button 116). In confirmation of the settings on the advanced setting screen, with respect to the item 801 as the setting target, the functions to be assigned to the AF-ON button half-pressing operation and the AF-ON button full-pressing operation are set as the functions 802 and 803 when the item 801 is set.

Figure 8C:
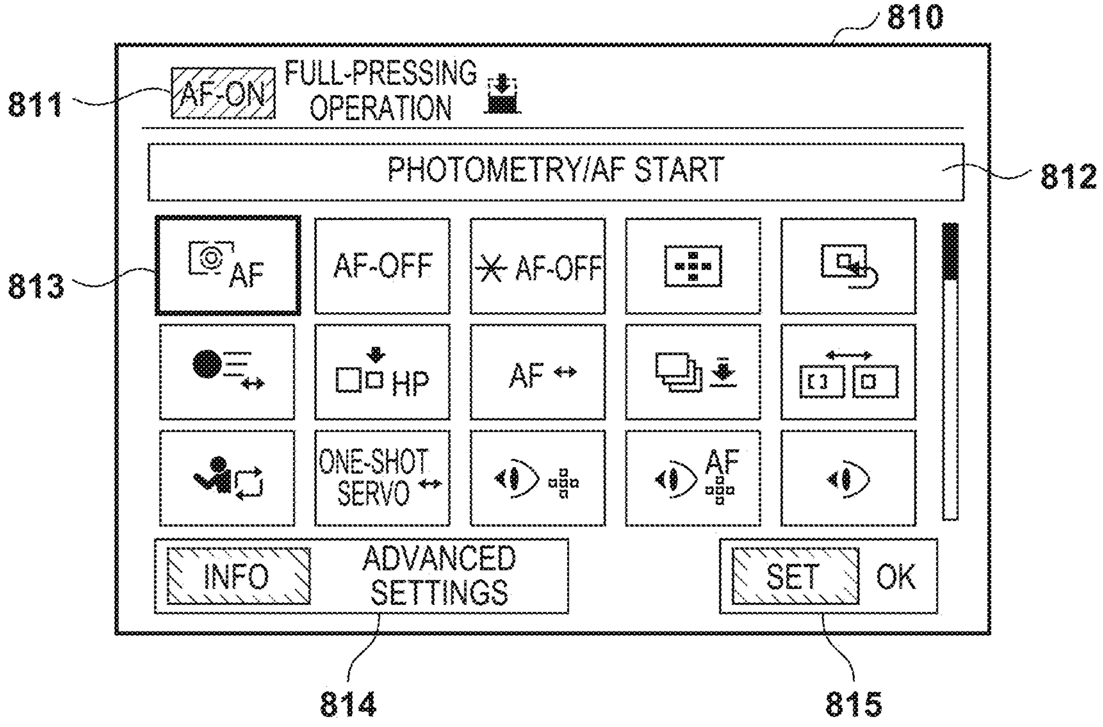
FIG. 8C is a view for explaining the method of assigning the function to the operation member according to the second embodiment.

FIG. 8C exemplifies a function change screen 810, and shows a screen for changing the function assigned to the operation unit by a user operation. An item 811 indicates an operation unit set with the function selected on the function change screen 810. In the example shown in FIG. 8C, the function change screen is for setting the function assigned to the AF-ON button half-pressing operation. On the function change screen 810, function icons corresponding to functions that can be assigned are displayed, a cursor 813 is displayed for the currently selected function icon, and text indicating the function is displayed as an item 812 with respect to the currently selected function. When the SET button 109 is pressed or a touch operation is performed on an OK icon 815, the settings on the function change screen 810 are confirmed, and the function selected on the function change screen 810 is displayed on an advanced setting screen 800 while being set for the setting target operation unit 811. With respect to some of the plurality of functions displayed on the function change screen 810, advanced settings can further be made. When a function for which advanced settings can be made is selected, an advanced setting icon 814 is displayed, and a function advanced setting screen 820 is displayed by pressing the INFO button or pressing the advanced setting icon 814.

Figure 8D:
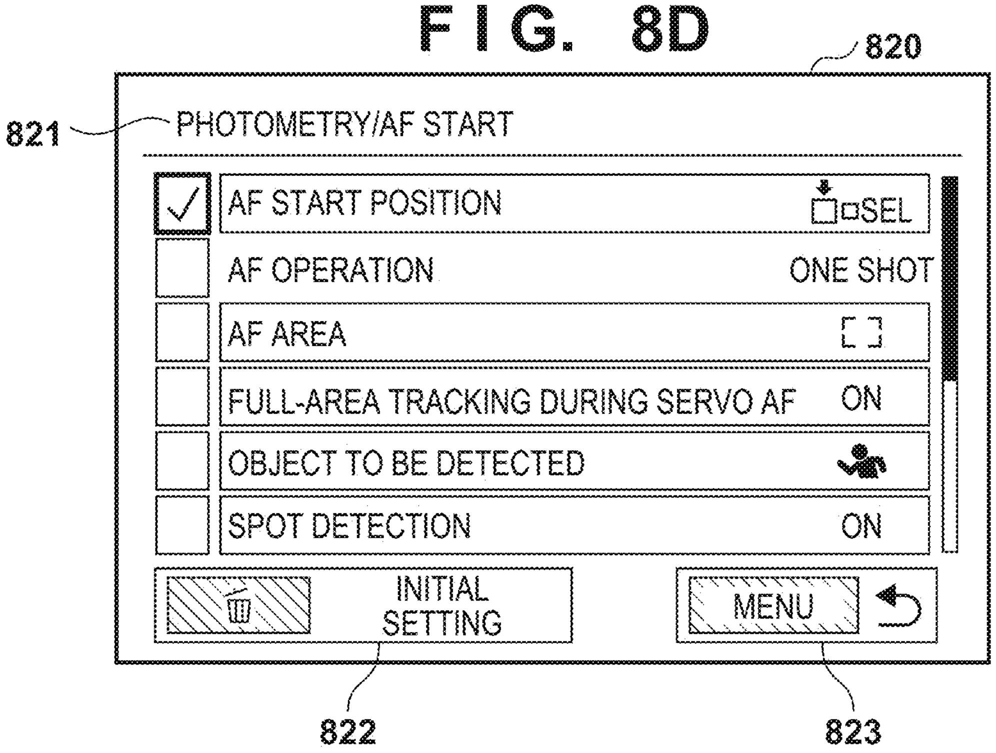
FIG. 8D is a view for explaining the method of assigning the function to the operation member according to the second embodiment.

FIG. 8D exemplifies the function advanced setting screen 820 with respect to the photometry/AF start function. On the function advanced setting screen 820, a function name 821 as an advanced setting target, an initial setting icon 822 for returning to the initial settings, a return icon 823 for confirming the settings and returning to the previous screen (function change screen 810), setting items for advanced settings, and the like are displayed. By performing a touch operation on the initial setting icon 822, the function advanced settings can be returned to the initial settings. When the menu button 114 is pressed or a touch operation is performed on the return icon 823, the settings on the function advanced setting screen 820 are reflected on the function 821 as the advanced setting target, and the screen returns to the function change screen 810 (the display is switched to display of the function change screen 810).

FIGS. 9A to 9F exemplify function change screens of AFON2 to AFON7, respectively.

Figure 9A:
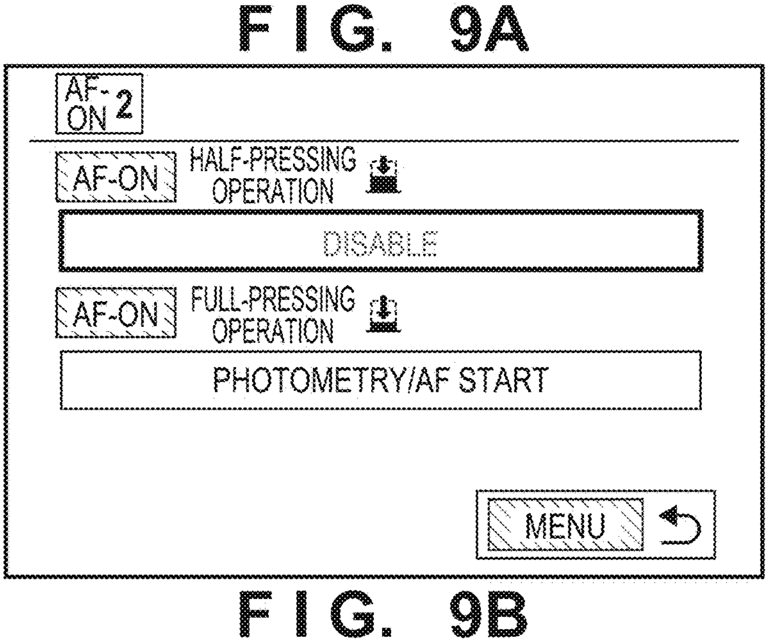
FIG. 9A is a view for explaining the method of assigning the function to the operation member according to the second embodiment.

FIG. 9A exemplifies the function change screen of AFON2. In AFON2, “disabled” is set for the AF-ON button half-pressing operation, and “photometry/AF start” as the default value is initially displayed for the AF-ON button full-pressing operation since a user setting can be made. On the function change screen of AFON2, “disabled” for the AF-ON button half-pressing operation is unchangeable, and is thus frayed out, and a user setting can be made for the AF-ON button full-pressing operation and the default value is normally displayed.

Figure 9B:
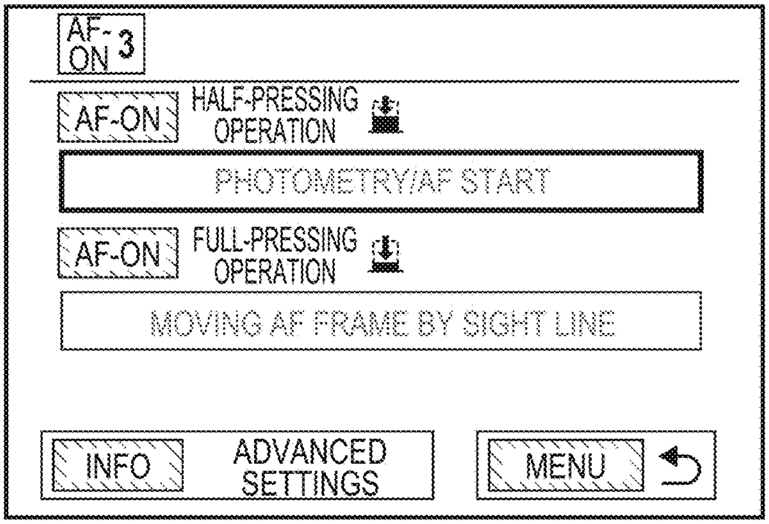
FIG. 9B is a view for explaining the method of assigning the function to the operation member according to the second embodiment.

FIG. 9B exemplifies the function change screen of AFON3. In AFON3, “photometry/AF start” is set for the AF-ON button half-pressing operation, and “moving AF frame by sight line” is set for the AF-ON button full-pressing operation. Therefore, on the function change screen of AFON3, both the functions of the AF-ON button half-pressing operation and the AF-ON button full-pressing operation cannot be set by the user, and are thus grayed out.

Figure 9C:
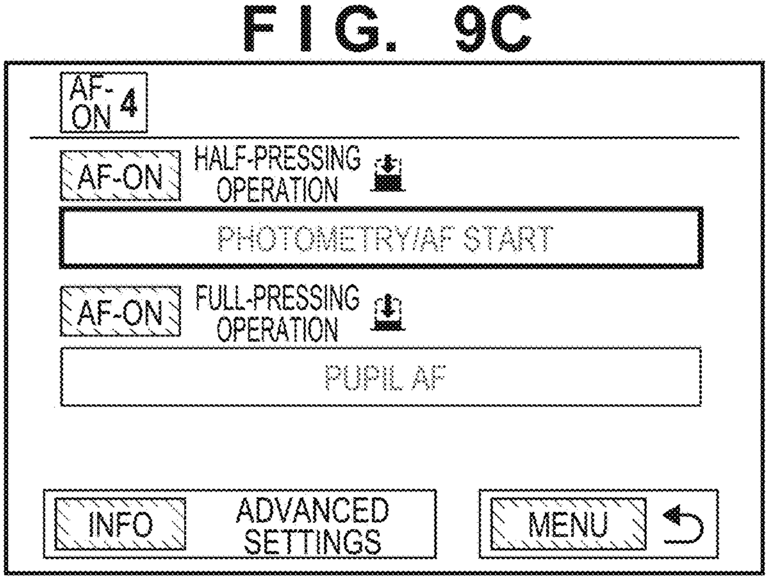
FIG. 9C is a view for explaining the method of assigning the function to the operation member according to the second embodiment.

FIG. 9C exemplifies the function change screen of AFON4. In AFON4, “photometry/AF start” is set for the AF-ON button half-pressing operation, and “pupil AF” is set for the AF-ON button full-pressing operation. Therefore, on the function change screen of AFON4, both the functions of the AF-ON button half-pressing operation and the AF-ON button full-pressing operation cannot be set by the user, and are thus grayed out.

Figure 9D:
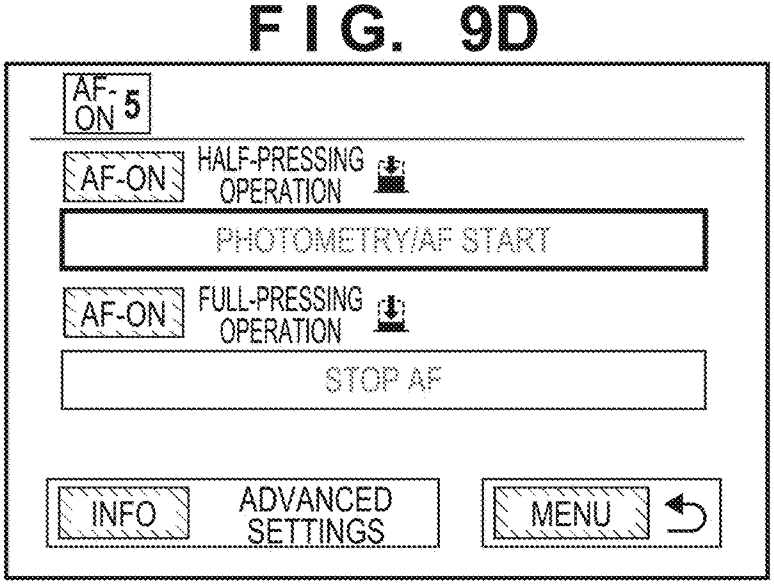
FIG. 9D is a view for explaining the method of assigning the function to the operation member according to the second embodiment.

FIG. 9D exemplifies the function change screen of AFON5. In AFON5, “photometry/AF start” is set for the AF-ON button half-pressing operation, and “AF stop” is set for the AF-ON button full-pressing operation. Therefore, on the function change screen of AFON5, both the functions of the AF-ON button half-pressing operation and the AF-ON button full-pressing operation cannot be set by the user, and are thus grayed out.

Figure 9E:
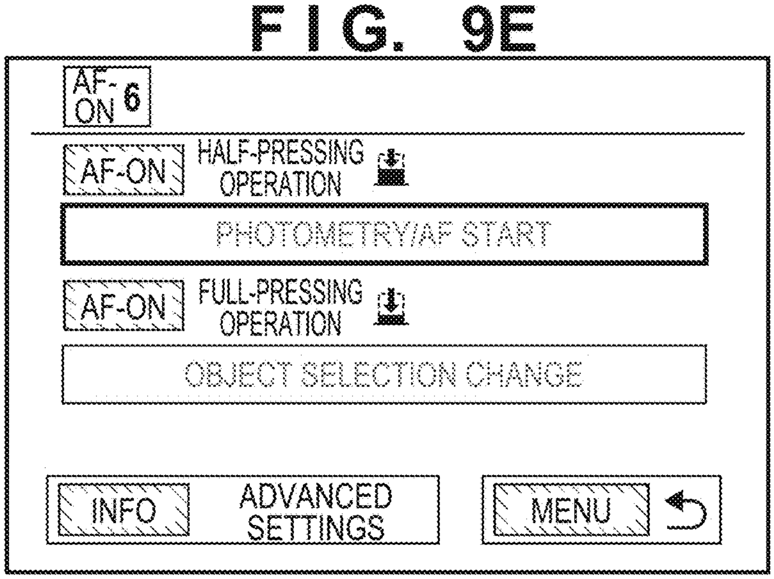
FIG. 9E is a view for explaining the method of assigning the function to the operation member according to the second embodiment.

FIG. 9E exemplifies the function change screen of AFON6. In AFON6, “photometry/AF start” is set for the AF-ON button half-pressing operation, and “object selection change” is set for the AF-ON button full-pressing operation. Therefore, on the function change screen of AFON6, both the functions of the AF-ON button half-pressing operation and the AF-ON button full-pressing operation cannot be set by the user, and are thus grayed out.

Figure 9F:
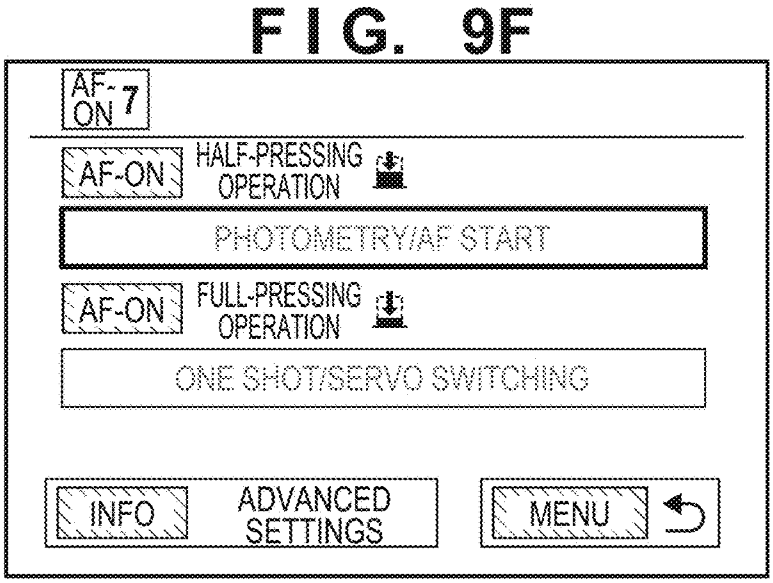
FIG. 9F is a view for explaining the method of assigning the function to the operation member according to the second embodiment.

FIG. 9F exemplifies the function change screen of AFON7. In AFON7, “photometry/AF start” is set for the AF-ON button half-pressing operation, and “ONE SHOT/SERVO switching” is set for the AF-ON button full-pressing operation. Therefore, on the function change screen of AFON7, both the functions of the AF-ON button half-pressing operation and the AF-ON button full-pressing operation cannot be set by the user, and are thus grayed out.

As shown in FIGS. 9B to 9F, in AFON3 to AFON7, “photometry/AF start” is set for the AF-ON button half-pressing operation, and is unchangeable. However, “photometry/AF start” is a function for which advanced settings can be made. Therefore, the advanced setting icon is displayed on each of the function change screens of AFON3 to AFON7, and when a touch operation is performed on the advanced setting icon or the INFO button is pressed, the function advanced setting screen 820 shown in FIG. 8D is displayed to allow the user to make advanced settings of the function.

Figure 10:
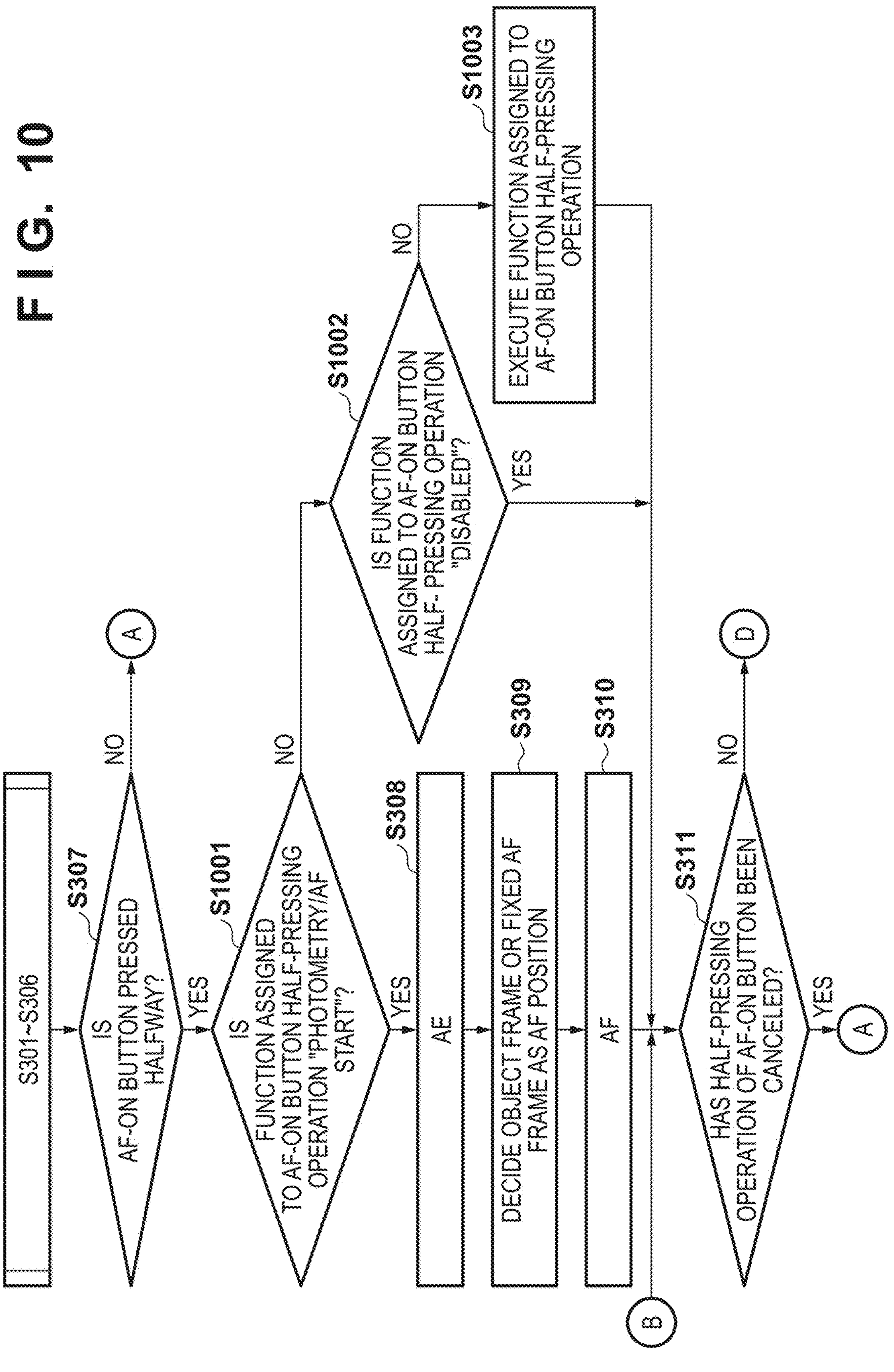
FIG. 10 is a flowchart illustrating control processing according to the second embodiment.
Figure 11A:
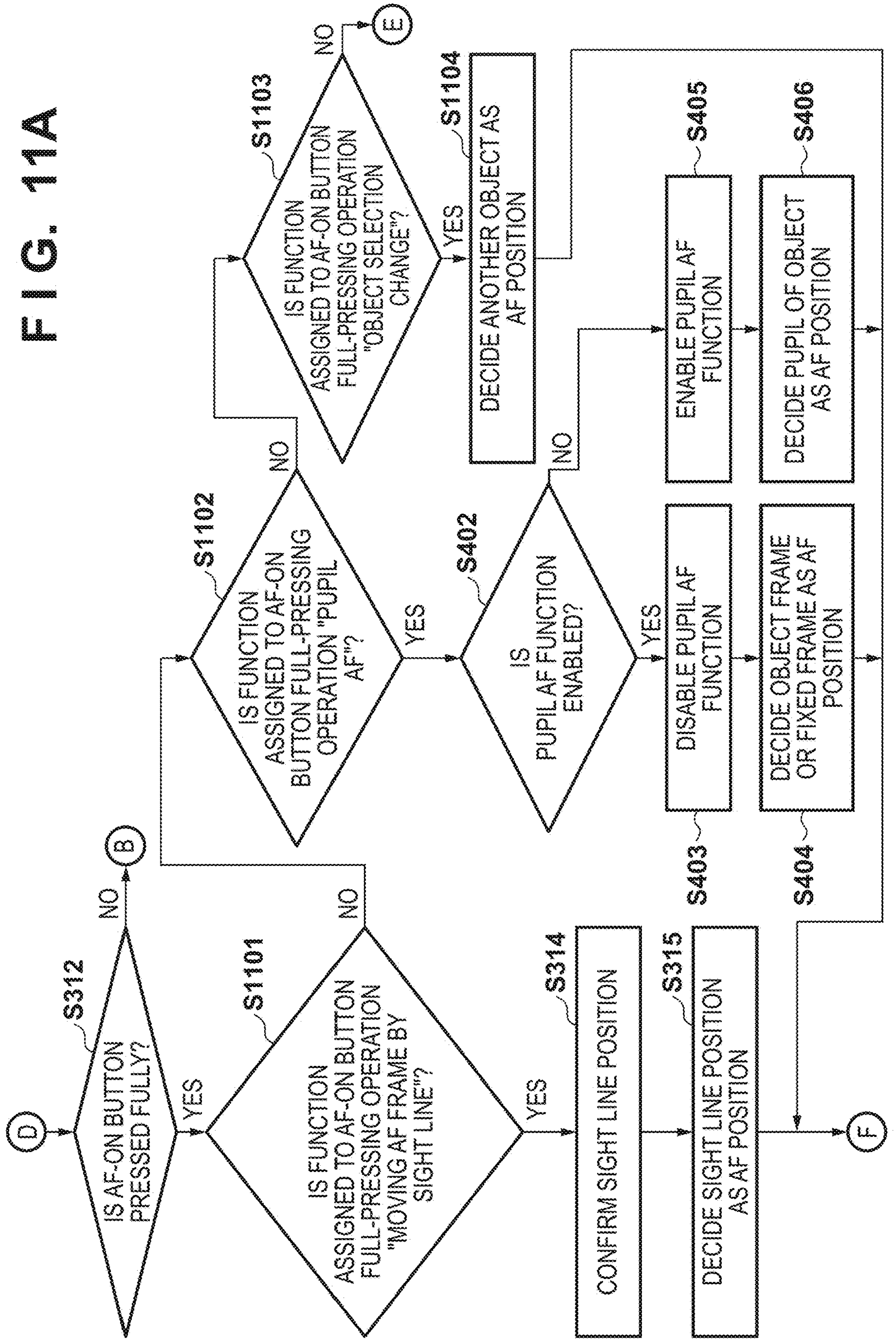
FIG. 11A is a flowchart illustrating the control processing according to the second embodiment.
Figure 11B:
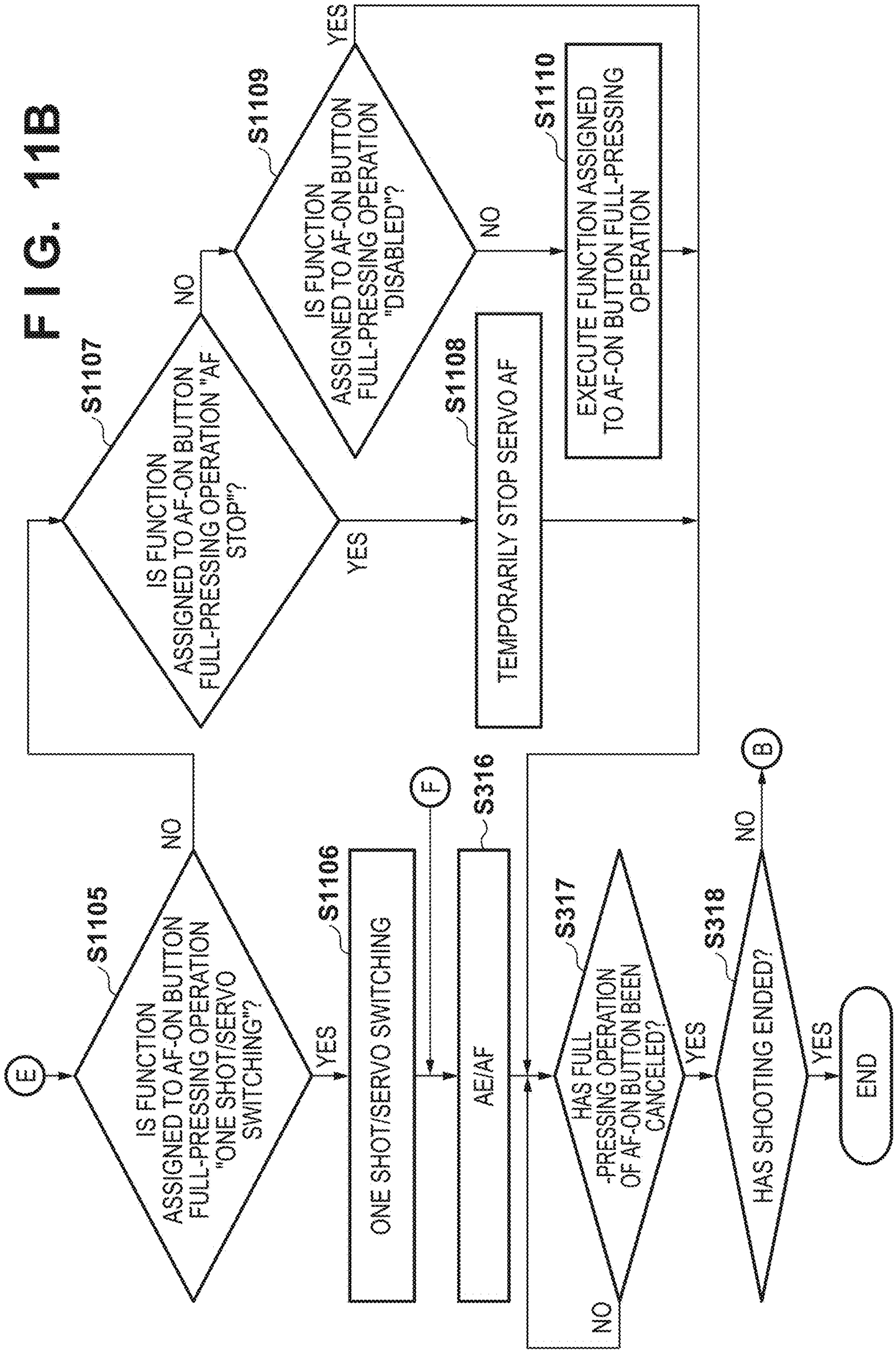
FIG. 11B is a flowchart illustrating the control processing according to the second embodiment.

FIGS. 10, 11A, and 11B are flowcharts illustrating control processing of the digital camera 100 according to the second embodiment.

The processing shown in FIGS. 10, 11A, and 11B is implemented when the system control unit 201 controls the respective components by deploying programs stored in a nonvolatile memory 256 to a system memory 252 and executing the programs. Note that the processing shown in FIGS. 10, 11A, and 11B shows an excerpt of processing related to the operation of the AF-ON button 116 in a shooting standby state (a state in which shooting recording processing by pressing the shutter-release button 102 fully in a shooting mode is not executed). Since the processing shown in FIGS. 10, 11A, and 11B is partially the same as the control processing (FIGS. 3A, 3B, 4A, and 4B) of the first embodiment, the same reference symbols denote the same processes and a description thereof will be omitted.

First, immediately after the digital camera 100 is activated or immediately after an operation mode shifts to a still image shooting mode or a moving image recording mode and display of a live view image is started, the control processing is started, and processes in steps S301 to S306 are executed, similar to the first embodiment.

When it is determined in step S307 that the AF-ON button 116 is pressed halfway, the system control unit 201 advances the processing to step S1001. When it is determined that the AF-ON button 116 is not pressed halfway, the system control unit 201 returns the processing to step S301, similar to the first embodiment.

In step S1001, the system control unit 201 determines whether the function assigned to the AF-ON button half-pressing operation is “photometry/AF start” on the function assignment setting screen 700 of the AF-ON button 116. When it is determined that the function assigned to the AF-ON button half-pressing operation is “photometry/AF start”, the system control unit 201 advances the processing to step S308. When it is determined that the function assigned to the AF-ON button half-pressing operation is not "photometry/AF start", the system control unit 201 advances the processing to step S1002.

In steps S308 to S311, the system control unit 201 executes the same processes as in steps S308 to S311 of FIG. 3A of the first embodiment.

In step S1002, the system control unit 201 determines whether the function assigned to the AF-ON button half-pressing operation is "disabled" on the function assignment setting screen 700 of the AF-ON button 116. A case where the function assigned to the AF-ON button half-pressing operation is "disabled" means that the function executed in accordance with the half-pressing operation is not assigned. When it is determined that the function assigned to the AF-ON button half-pressing operation is "disabled", that is, the function is not assigned, the system control unit 201 advances the processing to step S311, and controls not to execute processing for the half-pressing operation of the AF-ON button 116. When it is determined that the function assigned to the AF-ON button half-pressing operation is not "disabled", the system control unit 201 advances the processing to step S1003.

In step S1003, the system control unit 201 executes the function assigned to the AF-ON button half-pressing operation, and advances the processing to step S311.

In step S311, the system control unit 201 determines whether the half-pressing operation of the AF-ON button 116 is canceled. When it is determined that the half-pressing operation of the AF-ON button 116 is canceled, the system control unit 201 returns the processing to step S301. When it is determined that the half-pressing operation of the AF-ON button 116 is not canceled, the system control unit 201 advances the processing to step S312.

In step S312, the system control unit 201 determines whether the AF-ON button 116 is pressed fully. When it is determined that the AF-ON button 116 is pressed fully, the system control unit 201 advances the processing to step S1101. When it is determined that the AF-ON button 116 is not pressed fully, the system control unit 201 returns the processing to step S311.

In step S1101, the system control unit 201 determines whether the function assigned to the AF-ON button full-pressing operation is "moving AF frame by sight line" on the function assignment setting screen 700 of the AF-ON button 116. When it is determined that the function assigned to the AF-ON button full-pressing operation is "moving AF frame by sight line", the system control unit 201 advances the processing to step S314.

In steps S314 and S315, the system control unit 201 executes the same processes as in steps S314 and S315 of FIG. 3B of the first embodiment.

In step S316, the system control unit 201 executes AE processing and AF processing for an object at an AF position decided in step S315, and displays the AF frame for the object at the AF position. When it is determined in step S1101 that the function assigned to the AF-ON button full-pressing operation is not "moving AF frame by sight line", the system control unit 201 advances the processing to step S1102.

In step S1102, the system control unit 201 determines whether the function assigned to the AF-ON button full-pressing operation is "pupil AF" on the function assignment setting screen 700 of the AF-ON button. When it is determined that the function assigned to the AF-ON button full-pressing operation is "pupil AF", the system control unit 201 advances the processing to step S402.

In steps S402 to S406, the system control unit 201 executes the same processes as in steps S402 to S406 of FIG. 4A of the first embodiment, and then advances the processing to step S316. In step S316, the system control unit 201 executes AE processing and AF processing for an object at an AF position decided in step S404 or S406 to display the AF frame for the object at the AF position, and advances the processing to step S317. When it is determined in step S1102 that the function assigned to the AF-ON button full-pressing operation is not "pupil AF", the system control unit 201 advances the processing to step S1103.

In step S1103, the system control unit 201 determines whether the function assigned to the AF-ON button full-pressing operation is "object selection change" on the function assignment setting screen 700 of the AF-ON button. When it is determined that the function assigned to the AF-ON button full-pressing operation is "object selection change", the system control unit 201 advances the processing to step S1104. When it is determined that the function assigned to the AF-ON button full-pressing operation is not "object selection change", the system control unit 201 advances the processing to step S1105.

In step S1104, based on the result of object detection processing for the live view image by the image processing unit 224, the system control unit 201 decides, as a new AF position, an object different from the object currently set as the AF position. That is, the AF target object is changed from the currently selected object to another object. When only one object can be detected by the object detection processing, the AF target object may remain unchanged. When two or more objects are detected, the selection of the object is changed among the detected objects in order based on the size of the object, the position of the object, the priority, and the like every time the AF-ON button is pressed fully. Then, the system control unit 201 advances the processing to step S316, and executes AE processing and AF processing for the object (AF target object) at the AF position decided in step S1104 to display the AF frame for the object at the AF position. After that, the system control unit 201 advances the processing to step S317.

In step S1105, the system control unit 201 determines whether the function assigned to the AF-ON button full-pressing operation is "ONE SHOT/SERVO switching" on the function assignment setting screen 700 of the AF-ON button. When it is determined that the function assigned to the AF-ON button full-pressing operation is "ONE SHOT/SERVO switching", the system control unit 201 advances the processing to step S1106. When it is determined that the function assigned to the AF-ON button full-pressing operation is not "ONE SHOT/SERVO switching", the system control unit 201 advances the processing to step S1107.

In step S1106, the system control unit 201 changes the setting to servo AF in a case where the current AF operation setting is one-shot AF, and changes the setting to one-shot AF in a case where the current AF operation setting is servo AF. Then, the system control unit 201 advances the processing to step S316, and executes AE processing and AF processing with the AF operation setting switched in step S1106.

In step S1107, the system control unit 201 determines whether the function assigned to the AF-ON button full-pressing operation is "AF stop" on the function assignment setting screen 700 of the AF-ON button. When it is determined that the function assigned to the AF-ON button full-pressing operation is "AF stop", the system control unit 201 advances the processing to step S1108. When it is determined that the function assigned to the AF-ON button full-pressing operation is not "AF stop", the system control unit 201 advances the processing to step S1109.

In step S1108, when the AF operation setting is servo AF, the system control unit 201 temporarily stops the servo AF processing. When the AF operation setting is one-shot AF, the AF processing is not executed continuously, and thus this processing is not executed. While the AF-ON button is pressed fully, the system control unit 201 temporarily stops the servo AF processing of step S1107, and resumes the servo AF processing when the operation on the AF-ON button is canceled. Alternatively, when the function of "photometry/AF start" is assigned to the AF-ON button half-pressing operation, the system control unit 201 resumes the servo AF processing when the full-pressing operation of the AF-ON button 116 is canceled even if the AF-ON button 116 is pressed halfway. When another function is assigned to the AF-ON button half-pressing operation, the system control unit 201 may resume the servo AF processing when both the full-pressing operation and the half-pressing operation of the AF-ON button 116 are canceled.

In step S1109, the system control unit 201 determines whether the function assigned to the AF-ON button full-pressing operation is "disabled" on the function assignment setting screen 700 of the AF-ON button. A case where the function assigned to the AF-ON button full-pressing operation is "disabled" means that the function executed in accordance with the AF-ON button full-pressing operation is not assigned. When it is determined that the function assigned to the AF-ON button full-pressing operation is "disabled", that is, the function is not assigned, the system control unit 201 advances the processing to step S317, and controls not to execute processing for the AF-ON button full-pressing operation. When it is determined that the function assigned to the AF-ON button full-pressing operation is not "disabled", the system control unit 201 advances the processing to step S1110.

In step S1110, the system control unit executes the function assigned to the AF-ON button full-pressing operation on the function assignment setting screen 700 of the AF-ON button, and advances the processing to step S317.

In step S317, the system control unit 201 determines whether the full-pressing operation of the AF-ON button 116 has been canceled. The system control unit 201 stands by until the full-pressing operation of the AF-ON button 116 is canceled. When it is determined that the full-pressing operation of the AF-ON button 116 has been canceled, the system control unit 201 advances the processing to step S318.

In step S318, the system control unit 201 determines whether the shooting operation has ended by, for example, changing the operation mode of the digital camera 100. When it is determined that the shooting operation has ended, the system control unit 201 ends the processing. When it is determined that the shooting operation has not ended, the system control unit 201 returns the processing to step S311.

As described above, according to the second embodiment, on the function assignment setting screen 700 of the AF-ON button 116, a function can be assigned to each of the half-pressing operation and the full-pressing operation of the AF-ON button 116. A function assigned to the AF-ON button 116 can be set by a predetermined combination, as shown in FIG. 7B. Since the AF-ON button 116 is basically an operation unit provided to instruct "photometry/AF start", the "photometry/AF start" function is set for the half-pressing operation in each of AFON3 to AFON7. With respect to each of AFON3 to AFON7 in which the "photometry/AF start" function is set for the half-pressing operation, operability is improved by assigning, to the full-pressing operation, processing related to the "photometry/AF start" function executed by the half-pressing operation, and thus a function related to AF processing is set for the full-pressing operation. In addition, since an operation of changing the AF target object is often performed after executing the "photometry/AF start" function, a function of changing the AF target object is assigned to the full-pressing operation in each of AFON3, AFON4, and AFON6.

In a case where the "photometry/AF start" function is set for the half-pressing operation of the AF-ON button 116, and "moving AF frame by sight line" is set for the full-pressing operation, that is, a case where AFON3 is set on the function assignment setting screen 700 of the AF-ON button 116, the following processing is performed with respect to display of a sight line pointer. In a case where AFON3 is set, while the AF-ON button 116 is pressed, that is, while AF processing and AE processing (photometric processing) are performed, the system control unit 201 performs control to display the sight line pointer regardless of a setting on a sight line pointer display setting screen. In a case where the "photometry/AF start" function is set for the half-pressing operation of the AF-ON button 116, and "OFF" or "only in shooting standby state" is set as the display setting of the sight line pointer, the sight line pointer is not displayed normally while the AF-ON button 116 is pressed. However, in a case where "moving AF frame by sight line" is set for the full-pressing operation of the AF-ON button 116, the user cannot grasp, in advance, the object to which the frame is to move by the full-pressing operation unless the sight line pointer is displayed before the full-pressing operation of the AF-ON button 116. To cope with this, in a case where "moving AF frame by sight line" is set for the full-pressing operation of the AF-ON button 116, the system control unit 201 performs control to display the sight line pointer in accordance with the half-pressing operation of the AF-ON button 116 even if a setting is made not to display the sight line pointer at the time of the half-pressing operation of the AF-ON button 116. Note that the sight line pointer may be displayed only at the time of the half-pressing operation of the AF-ON button 116 or may be displayed at the time of the half-pressing operation and the full-pressing operation of the AF-ON button 116.

According to the second embodiment, "AF stop" is set for the full-pressing operation of the AF-ON button 116 in AFON5, but "start/stop of full-area tracking" may be set. In this case, when AFON5 is set on the function assignment setting screen 700 of the AF-ON button, and the AF-ON button 116 is pressed fully, the following operation is performed. When the function assigned to the full-pressing operation of the AF-ON button 116 is "start/stop of full-area tracking", the system control unit 201 determines whether AF processing (face AF function) for the face of the object is enabled. When the AF processing (face AF function) for the face of the object is enabled, the system control unit 201 enables AF processing for the fixed frame, and advances to processing in step S316 and subsequent steps of FIG. 11B; otherwise, the system control unit 201 enables the AF processing (face AF function) for the face of the object, and advances to processing in step S316 and subsequent steps of FIG. 11B. Note that every time the full-pressing operation of the AF-ON button 116 is repeated (after the full-pressing operation of the AF-ON button 116 is canceled, the AF-ON button 116 is pressed fully again), it is possible to alternately enable the AF processing (face AF function) for the face of the object and the AF processing for the fixed frame. Therefore, it is possible to execute the AF processing while switching the AF position to the face of the object or the position of the fixed frame. Note that when the pupil AF function is enabled, every time the full-pressing operation of the AF-ON button 116 is repeated, the AF position may be switched to the pupil of the object or the position of the fixed frame. As described above, by pressing the AF-ON button 116 halfway or fully, the user can differently use the function of executing AF (Auto Focus) processing and AE (Auto Exposure) processing in a live view image or the function of switching the AF target to the face of the object, the pupil, or the position of the fixed frame. By assigning "start/stop of full-area tracking" to the full-pressing operation of the AF-ON button 116, an operation of changing the AF target to a position to be originally autofocused while switching the AF target to the position of the fixed frame can be performed with a small number of steps when the face of an unintended object is autofocused.

Furthermore, "enlargement/reduction" may be settable for the full-pressing operation of the AF-ON button 116 in AFON5. In this case, when AFON5 is set on the function assignment setting screen 700 of the AF-ON button 116 and the AF-ON button 116 is pressed fully, the following operation is performed. When the function assigned to the full-pressing operation of the AF-ON button 116 is "enlargement/reduction", the system control unit 201 enlarges a live view image with respect to the face of the object, the pupil, or the position (to be referred to as an enlargement position hereinafter) of the fixed frame while maintaining an AE processing result/AF processing result, and advances to processing in step S317 and subsequent steps of FIG. 11B. Note that "enlargement/reduction" is enabled in a case where the AF operation setting is one-shot AF. When the AF operation setting is servo AF, the enlargement position always, continuously moves, and thus the system control unit 201 advances to processing in step S317 and subsequent steps of FIG. 11B without performing any processing. Every time the full-pressing operation of the AF-ON button 116 is repeated (after the full-pressing operation of the AF-ON button 116 is canceled, the AF-ON button 116 is pressed fully again), enabling/disabling (equal magnification) of enlargement of the live view image may be switched with respect to the enlargement position in the live view image. Every time the full-pressing operation of the AF-ON button 116 is repeated (after the full-pressing operation of the AF-ON button 116 is canceled, the AF-ON button 116 is pressed fully again), display may be performed by changing the enlargement magnification to ×5, ×10, and equal magnification in this order with respect to the enlargement position in the live view image. In the second embodiment, the enlargement magnification is set to ×5 or ×10, but the changed magnification is not limited to these. The order of changing the enlargement magnification may be freely changed. As described above, by pressing the AF-ON button 116 halfway or fully, the user can differently use the function of executing AF (Auto Focus) processing and AE (Auto Exposure) processing in the live view image or the function of performing enlarged/reduced display for the enlargement position in the live view image. By assigning "enlargement/reduction" to the full-pressing operation of the AF-ON button 116, the user can perform, with a small number of steps, enlarged display of the live view image by pressing the AF-ON button 116 fully and confirmation of whether the object is autofocused.

In the above-described embodiment, one of AFON1 to AFON7 is settable as the functions assigned to the half-pressing operation and the full-pressing operation of the AF-ON button 116 on the function assignment setting screen 700. However, different functions can be set for the half-pressing operation and the full-pressing operation of the AF-ON button 116 in each of the shooting mode and the reproduction mode. The function set in each of the items (AFON1 to AFON7) settable on the function assignment setting screen 700 may be different between the shooting mode and the reproduction mode. In addition, the number of items (AFON1 to AFON7 in FIG. 7A) settable on the function assignment setting screen 700 may be different between the shooting mode and the reproduction mode.

According to the present embodiment, it is possible to differently use a plurality of functions related to predetermined processing by one operation unit on which a plurality of pressing operations can be performed and thus reducing the number of steps of the operation.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capture apparatus comprising:

an imaging unit;

a processing unit configured to perform predetermined processing for an object in an image captured by the imaging unit;

a sight line detection unit configured to detect a sight line position of a user;

a first operation unit configured to issue a shooting instruction;

a second operation unit different from the first operation unit; and a control unit configured to perform control to execute the predetermined processing for a first object in the image in accordance with a first pressing operation on the second operation unit and to switch a target of the predetermined processing to an object corresponding to the sight line position of the user in accordance with a second pressing operation following the first pressing operation on the second operation unit.

2. The image capture apparatus according to claim 1, wherein the control unit performs control to execute the predetermined processing for the first object in the image in accordance with the first pressing operation on the second operation unit and to switch the target of the predetermined processing between an entire face and a pupil of the first object in accordance with the second pressing operation on the second operation unit.

3. The image capture apparatus according to claim 2, wherein the control unit performs control to execute the predetermined processing for the first object in the image in accordance with the first pressing operation on the second operation unit and to switch the target of the predetermined processing among an entire face, a right eye, and a left eye of the first object in accordance with the second pressing operation on the second operation unit.

4. The image capture apparatus according to claim 1, wherein the control unit performs control to execute the predetermined processing for the first object in the image in accordance with the first pressing operation on the second operation unit and to switch the target of the predetermined processing between a right eye and a left eye of the first object in accordance with the second pressing operation on the second operation unit.

5. The image capture apparatus according to claim 1, wherein the first pressing operation on the second operation unit is a half-pressing operation on the second operation unit, and the second pressing operation on the second operation unit is a full-pressing operation on the second operation unit.

6. The image capture apparatus according to claim 1, comprising:

object detection unit configured to detect an object from the image captured by the imaging unit, wherein the first object is one of the object decided by the object detection unit and an object designated by a user.

7. The image capture apparatus according to claim 2, comprising:

a setting unit configured to enable or disable a sight line input function based on detection of a sight line by the sight line detection unit, wherein in a case where the sight line input function is disabled, the control unit executes the predetermined processing for a pupil of the first object without switching the object as the target of the predetermined processing according to the sight line position of the user in accordance with the second pressing operation on the second operation unit.

8. The image capture apparatus according to claim 7, wherein in a case where the first pressing operation and the second pressing operation on the second operation unit are repeated while the sight line input function is disabled, the control unit switches the target of the predetermined processing to one of a pupil of the first object and a face of the first object every time the second pressing operation is performed on the second operation unit.

9. The image capture apparatus according to claim 2, comprising:

a setting unit configured to enable or disable a sight line input function based on detection of a sight line by the sight line detection unit, wherein in a case where the second pressing operation is performed on the second operation unit while the sight line input function is disabled, the control unit executes the predetermined processing for an object different from the first object and decided regardless of the sight line position of the user.

10. The image capture apparatus according to claim 9, wherein in a case where the first pressing operation and the second pressing operation on the second operation unit are repeated, the control unit switches the object as the target of the predetermined processing every time the second pressing operation is performed on the second operation unit.

11. The image capture apparatus according to claim 1, wherein in a case where a state returns to a state in which the first pressing operation is performed after the second pressing operation is performed on the second operation unit, the control unit executes the predetermined processing for the object as the target of the predetermined processing, which has been switched in accordance with the second pressing operation.

12. The image capture apparatus according to claim 1, wherein the control unit performs control to execute the predetermined processing for an object in an image in accordance with the first pressing operation on the first operation unit and to execute recording processing of capturing an image by the imaging unit and recording the image in accordance with the second pressing operation on the first operation unit.

13. The image capture apparatus according to claim 1, comprising:

an assignment unit configured to assign, in accordance with a user operation, a first function to be executed in accordance with the first pressing operation on the second operation unit and a second function to be executed in accordance with the second pressing operation on the second operation unit to the second operation unit.

14. The image capture apparatus according to claim 1, comprising:

an assignment unit configured to assign, in accordance with a user operation, a function to be executed in accordance with an operation on an operation unit of the image capture apparatus, wherein the control unit performs control to execute the predetermined processing for an object in an image in accordance with the first pressing operation on the first operation unit and to execute recording processing of capturing an image by the imaging unit and recording the image in accordance with the second pressing operation on the first operation unit, and the assignment unit can assign, in accordance with a user operation, a function to be executed in accordance with the second pressing operation on the second operation unit, and cannot assign, in accordance with a user operation, a function to be executed in accordance with the second pressing operation on the first operation unit.

15. The image capture apparatus according to claim 1, wherein the control unit controls not to execute the predetermined processing while the second operation unit is not operated and to execute the predetermined processing in accordance with the first pressing operation on the second operation unit.

16. The image capture apparatus according to claim 1, wherein the predetermined processing is processing of performing photometry for an object in the image and focusing on the object.

17. The image capture apparatus according to claim 1, wherein the first operation unit is a shutter-release button.

18. A control method for an image capture apparatus, wherein the image capture apparatus comprises:

an imaging unit;

a processing unit configured to perform predetermined processing for an object in an image captured by the imaging unit;

a sight line detection unit configured to detect a sight line position of a user;

a first operation unit configured to issue a shooting instruction; and a second operation unit different from the first operation unit, wherein the control method comprises:

performing control to execute the predetermined processing for a first object in the image in accordance with a first pressing operation on the second operation unit and to switch a target of the predetermined processing to an object corresponding to the sight line position of the user in accordance with a second pressing operation following the first pressing operation on the second operation unit.

19. A non-transitory computer-readable storage medium storing a program for causing a computer to function as an image capture apparatus comprising:

an imaging unit;

a processing unit configured to perform predetermined processing for an object in an image captured by the imaging unit;

a sight line detection unit configured to detect a sight line position of a user;

a first operation unit configured to issue a shooting instruction;

a second operation unit different from the first operation unit; and a control unit configured to perform control to execute the predetermined processing for a first object in the image in accordance with a first pressing operation on the second operation unit and to switch a target of the predetermined processing to an object corresponding to the sight line position of the user in accordance with a second pressing operation following the first pressing operation on the second operation unit.

* * * * *